(12) United States Patent
Johnson et al.

(10) Patent No.: US 9,318,012 B2
(45) Date of Patent: Apr. 19, 2016

(54) NOISE CORRECTING PATIENT FALL RISK STATE SYSTEM AND METHOD FOR PREDICTING PATIENT FALLS

(76) Inventors: Steve Gail Johnson, Highland Village, TX (US); Kyle Brook Johnson, Plano, TX (US); Stephen Ecker, The Colony, TX (US)

( * ) Notice: Subject to any disclaimer, the term of this patent is extended or adjusted under 35 U.S.C. 154(b) by 416 days.

(21) Appl. No.: 13/429,101

(22) Filed: Mar. 23, 2012

(65) Prior Publication Data
US 2015/0199892 A1   Jul. 16, 2015

Related U.S. Application Data

(60) Provisional application No. 61/513,523, filed on Jul. 29, 2011.

(51) Int. Cl.
*G08B 21/04* (2006.01)
*G08B 31/00* (2006.01)
*H04N 7/18* (2006.01)

(52) U.S. Cl.
CPC ............ *G08B 21/0476* (2013.01); *G08B 31/00* (2013.01); *H04N 7/183* (2013.01)

(58) Field of Classification Search
CPC .. A61B 5/1112; A61B 5/113; A61B 5/66822; A61B 5/6889; G06F 19/3418; G06F 19/3425
USPC .......................................................... 348/77
See application file for complete search history.

(56) References Cited

U.S. PATENT DOCUMENTS

| 4,608,559 A | 8/1986 | Friedman et al. |
| RE32,327 E | 1/1987 | Biba et al. |
| 4,885,795 A | 12/1989 | Bunting et al. |
| 5,343,240 A | 8/1994 | Yu |
| 5,574,964 A | 11/1996 | Hamlin |
| 5,798,798 A | 8/1998 | Rector et al. |

(Continued)

FOREIGN PATENT DOCUMENTS

| WO | PCT/US/9921900 | 9/1999 |
| WO | PCT/US/0203805 | 2/2002 |

OTHER PUBLICATIONS

Fall prevention, Web Site, Premier, Inc., Charlotte, NC., http://www.premierinc.com/safety/topics/falls/, last checked May 6, 2008.

*Primary Examiner* — Tung Vo
(74) *Attorney, Agent, or Firm* — Seth H. Ostrow, Esq.; Meister Seelig & Fein LLP

(57) ABSTRACT

A patient fall prediction system from noise corrected surveillance video by identifying patient fall risk states. A hierarchy of discrete patient fall risk states, from no risk, to intermediate risk to critical risk, describe a patient fall risk. The system transitions from state to state based on changes detected in corresponding areas between a current video frame and a background frame. A set of fall risk state transition rules govern the entry into new fall risk states. A video frame is subdivided into multiple predetermined areas, at least two contain images of the patient. The number of false alarms are reduced by accurately defining fall risk state transition rules and by reducing the opportunity for noise to impact the state transition results. Frames that contain new changes are excluded from fall risk state processing, i.e., the first video frame that might cause an erroneous elevated fall risk state is culled.

20 Claims, 20 Drawing Sheets

(56) References Cited

U.S. PATENT DOCUMENTS

| | | |
|---|---|---|
| 5,995,146 A | 11/1999 | Rasmussen |
| 6,195,797 B1 | 2/2001 | Williams, Jr. |
| 6,259,443 B1 | 7/2001 | Williams, Jr. |
| 6,311,268 B1 | 10/2001 | Chu |
| 6,317,885 B1 | 11/2001 | Fries |
| 6,323,897 B1 | 11/2001 | Kogan et al. |
| 6,429,233 B1 | 8/2002 | Oguri et al. |
| 6,456,320 B2 | 9/2002 | Kuwano et al. |
| 6,457,057 B1 | 9/2002 | Kageyu et al. |
| 6,757,909 B1 | 6/2004 | Maruo et al. |
| 6,897,781 B2 | 5/2005 | Cooper et al. |
| 7,078,676 B2 | 7/2006 | Smith et al. |
| 7,612,666 B2 * | 11/2009 | Badawy .................. 340/541 |
| 8,675,920 B2 * | 3/2014 | Hanson et al. ............. 382/103 |
| 2002/0019984 A1 | 2/2002 | Rakib |
| 2002/0044059 A1 | 4/2002 | Reeder |
| 2002/0069417 A1 | 6/2002 | Kliger et al. |
| 2002/0104098 A1 | 8/2002 | Zustak |
| 2002/0147982 A1 | 10/2002 | Naidoo |
| 2002/0163577 A1 | 11/2002 | Myers |
| 2003/0010345 A1 | 1/2003 | Koblasz et al. |
| 2003/0025599 A1 | 2/2003 | Monroe |
| 2004/0105006 A1 | 6/2004 | Lazo |
| 2007/0136102 A1 | 6/2007 | Rodgers |
| 2009/0278934 A1 * | 11/2009 | Ecker et al. ............... 348/152 |
| 2013/0127620 A1 * | 5/2013 | Siebers et al. ............ 340/573.1 |

\* cited by examiner

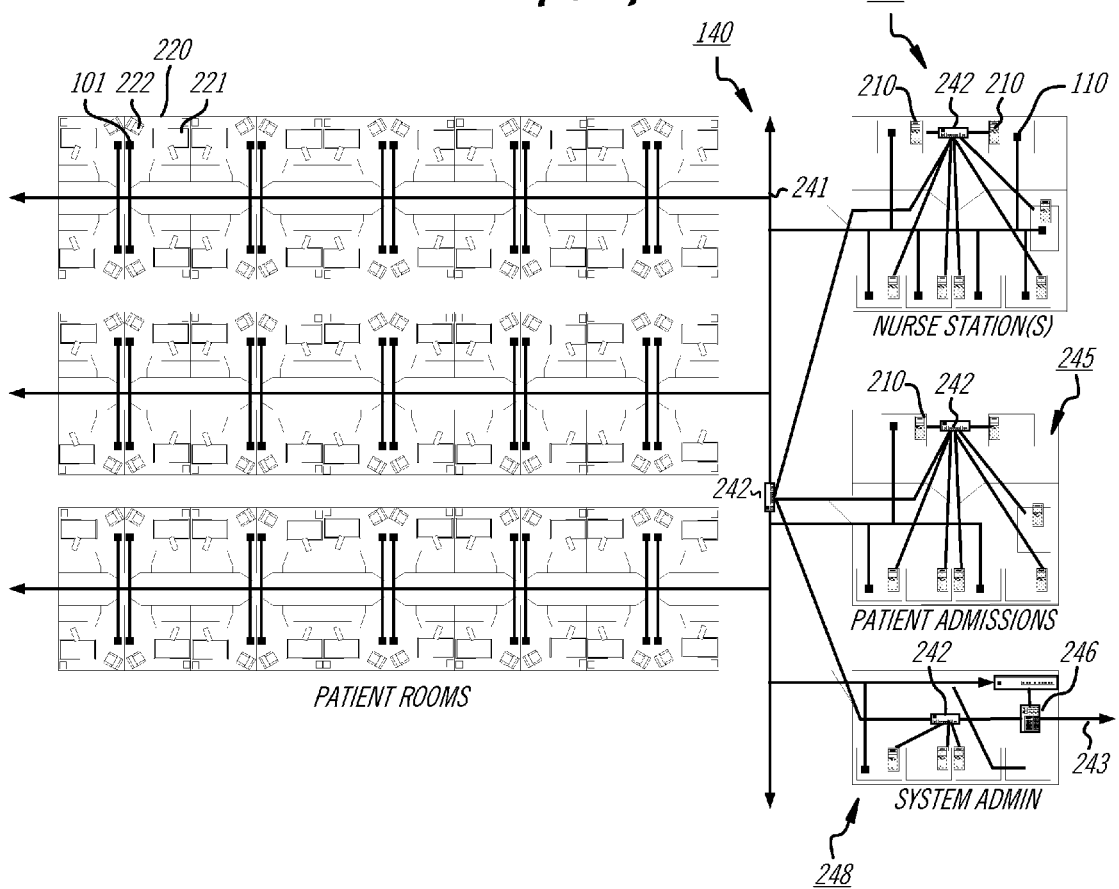

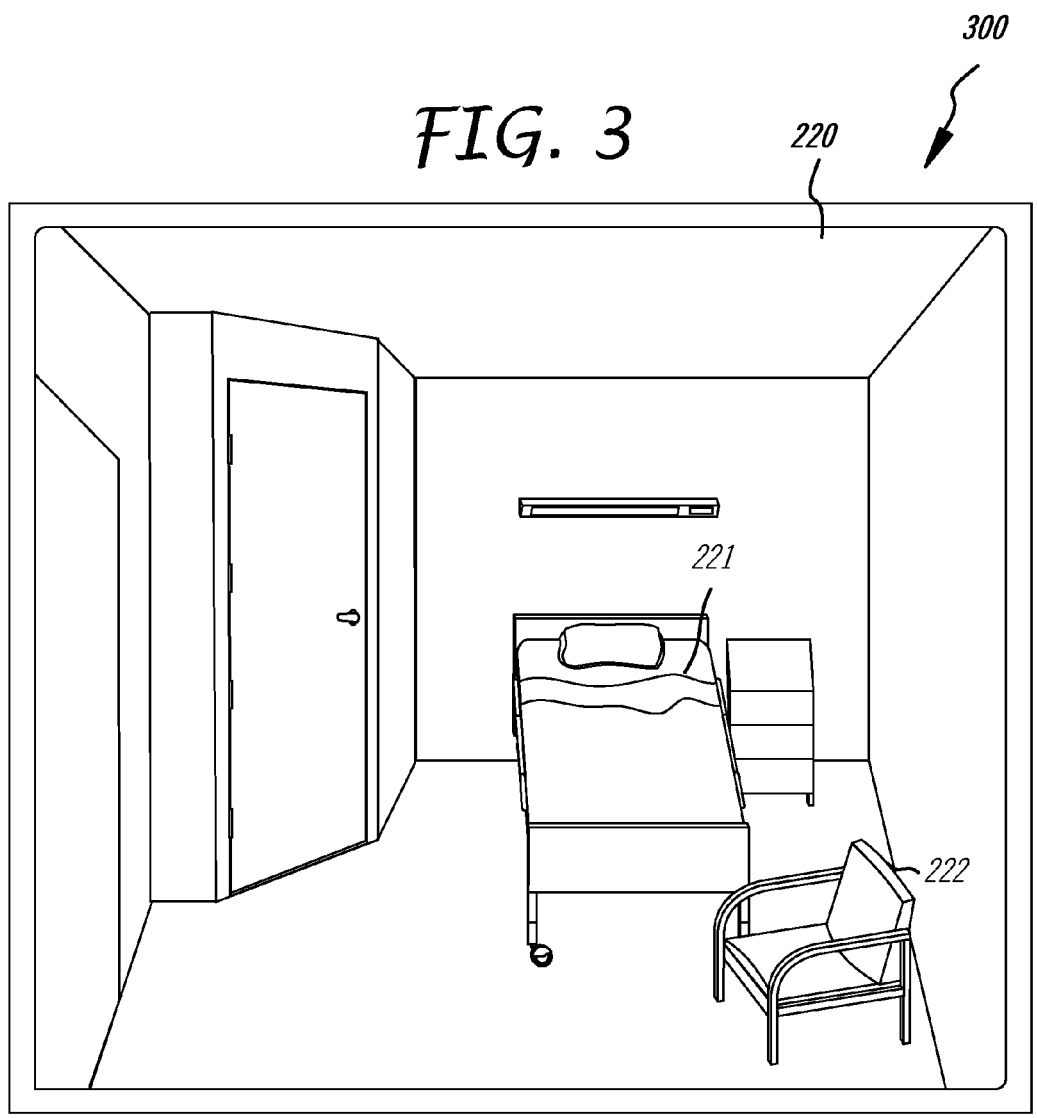

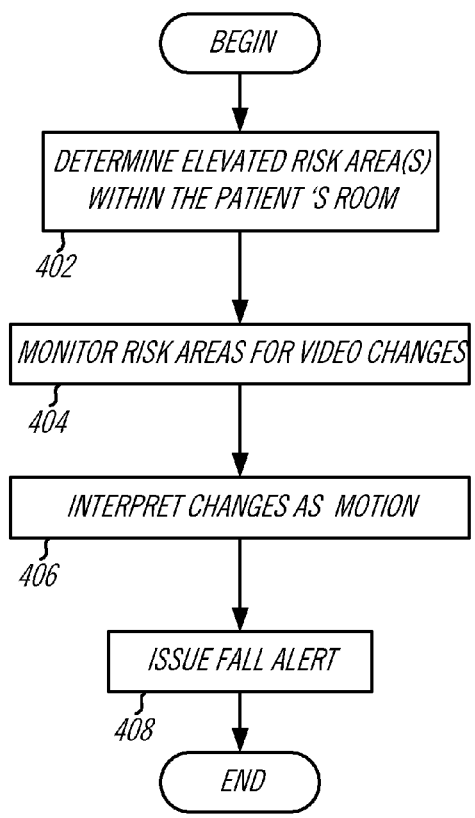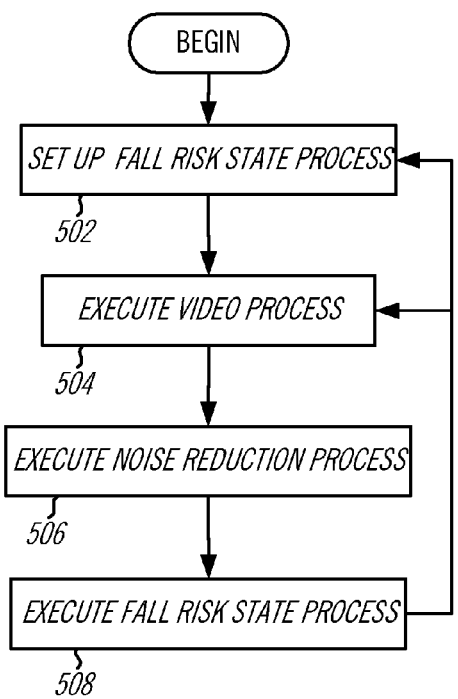

FALL RISK STATE FRAME PROCESSING

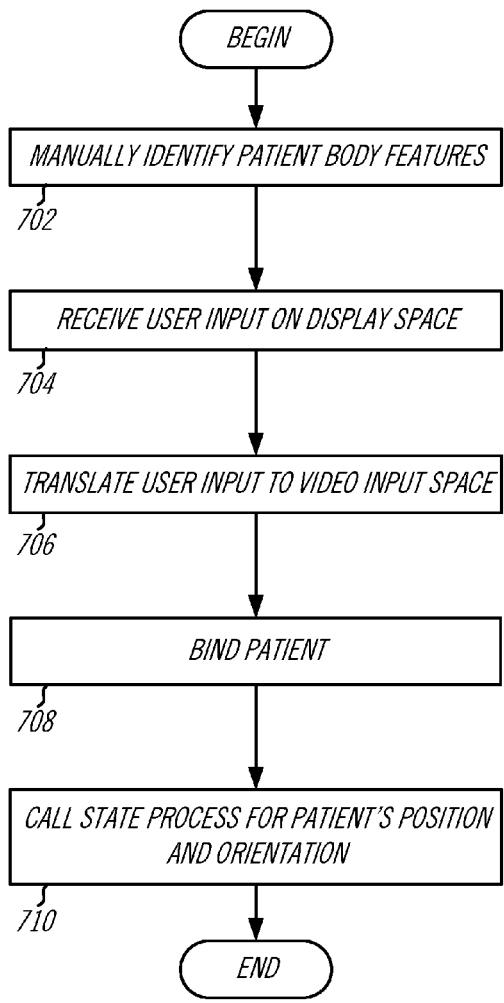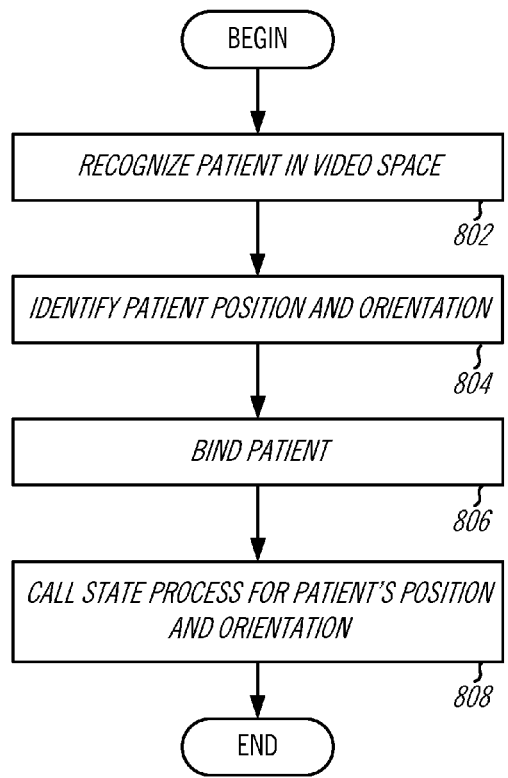

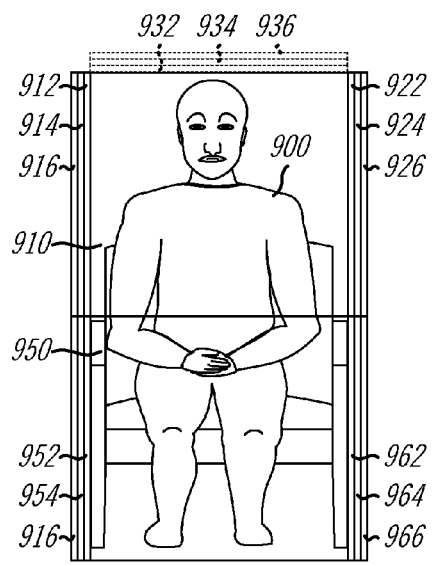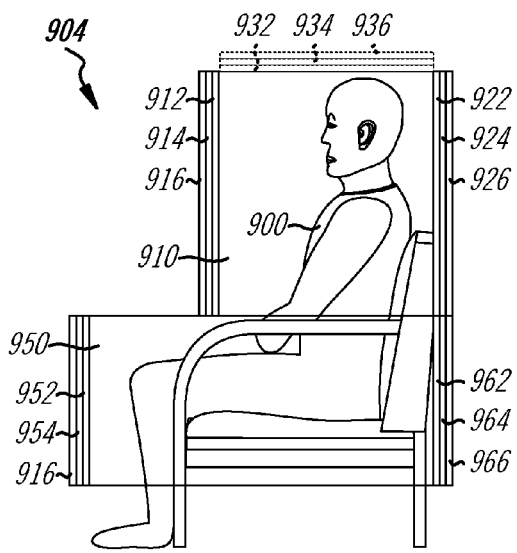

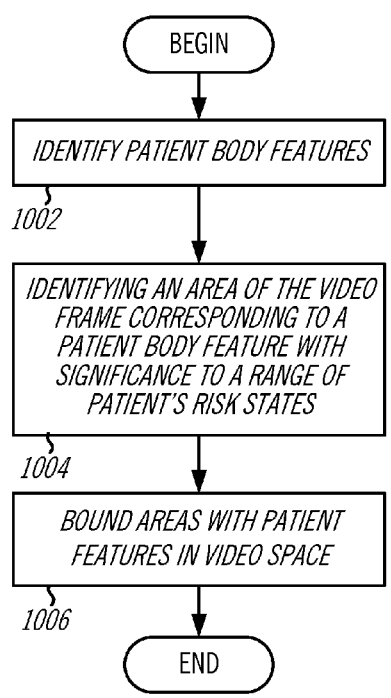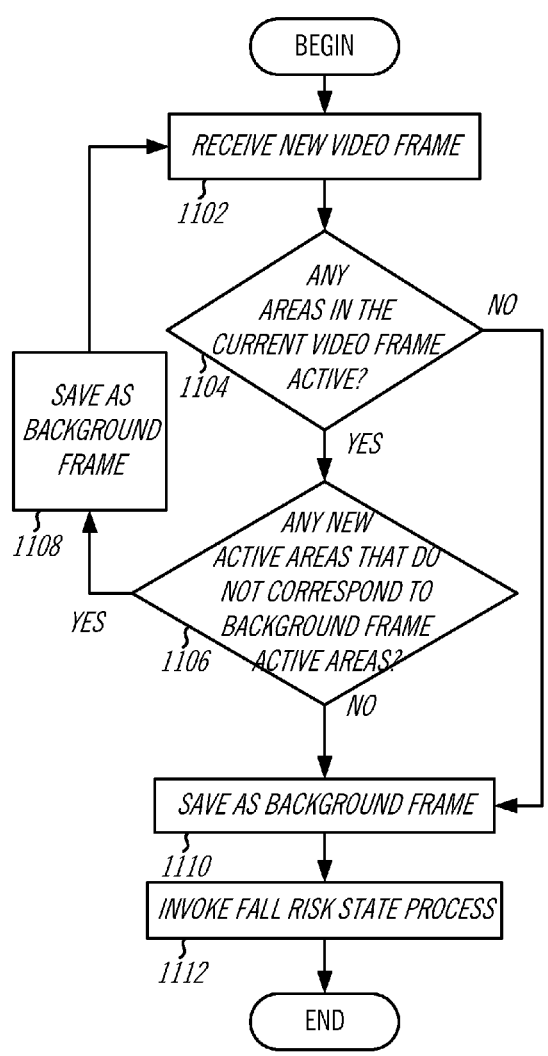

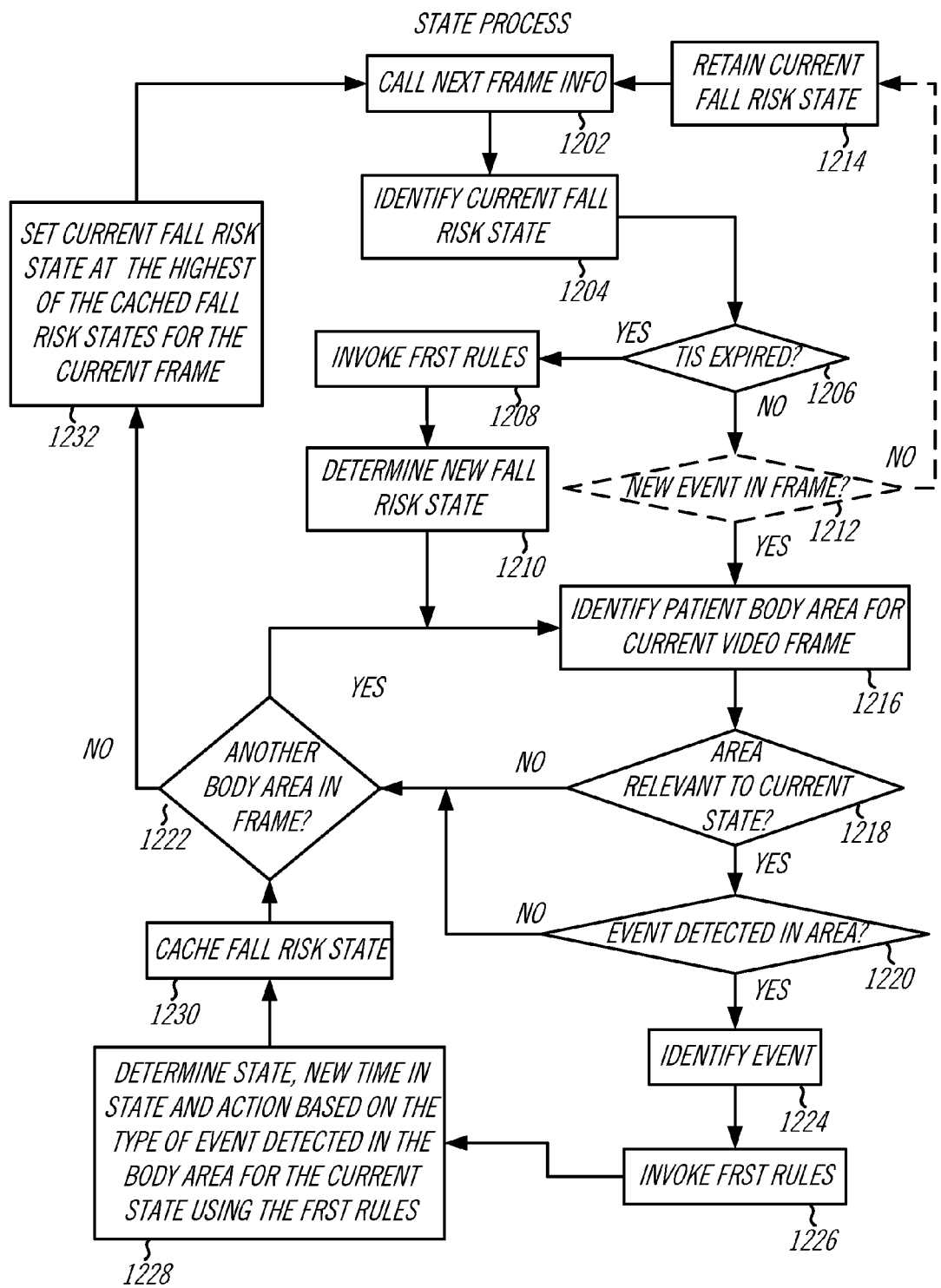

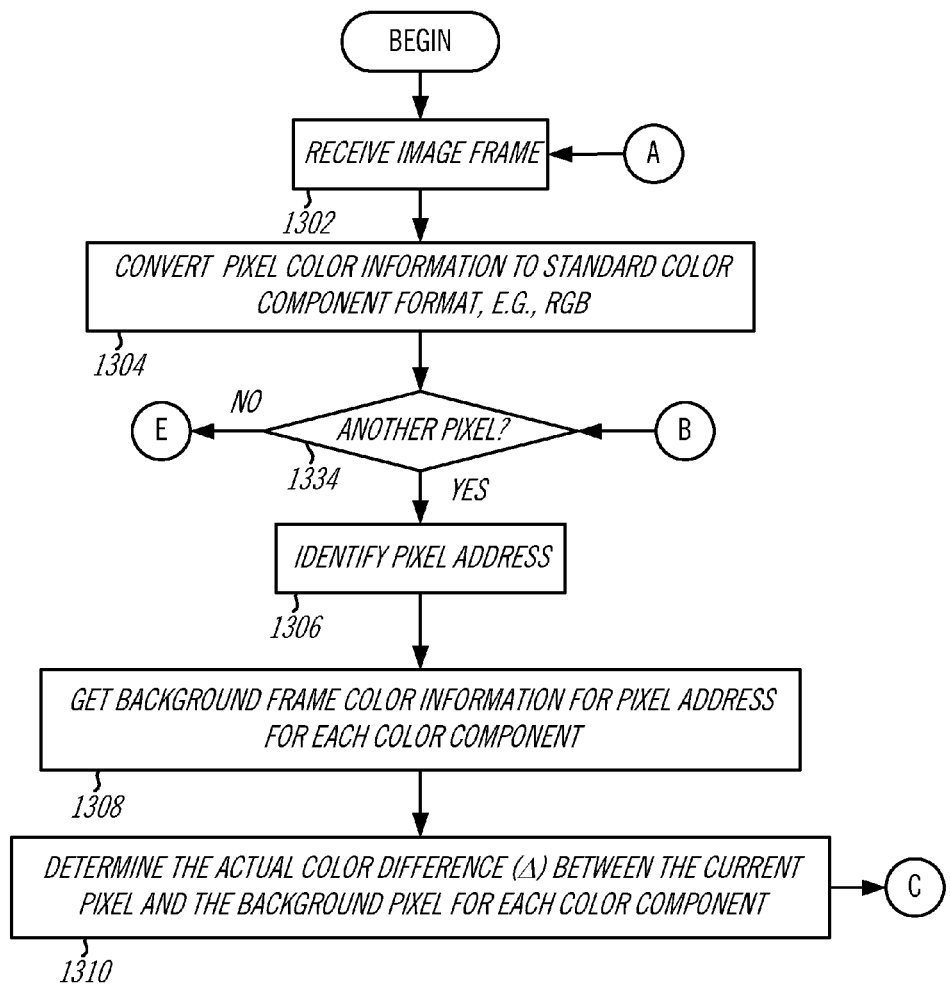

VIDEO PROCESSING

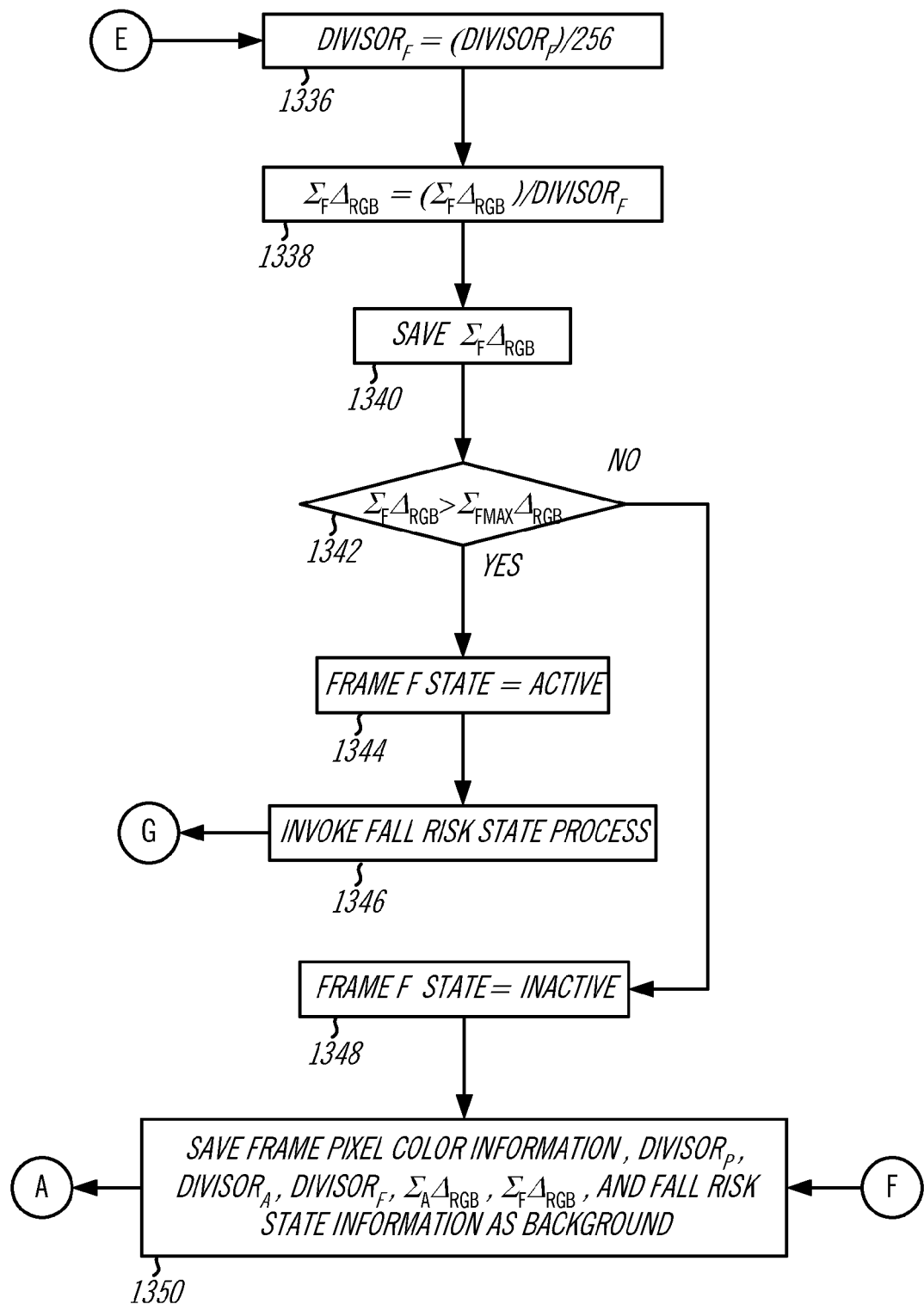

VIDEO PROCESSING

FIG. 14A
EXAMPLE STATE PROCESS

| States (in order of precedence*) | Full Video Frame Active | Full Video Frame Inactive | Upper Torso Active | Upper Torso Inactive | Lower Torso Active | Lower Torso Inactive | Upper 3 (Outer Torso Rail) | Upper 2 (Middle Torso Rail) | Upper 1 (Inner Torso Rail) | Lower 3 (Outer Torso Rail) | Lower 2 (Middle Torso Rail) | Lower 1 (Inner Torso Rail) |
|---|---|---|---|---|---|---|---|---|---|---|---|---|
| | | | | | | | | | Events (Recumbent Patient) | | | |
| Trigger | Raise Motion Flag | N/A | Active | Inactive | Active | Inactive | Active | Active | Active | Active | Active | Active |
| Wait | Raise Motion Flag | N/A | No Action | No Wait = 15 | No Action | No Action | No Action | No Action | No Action | No Action | No Action | No Action |
| Listen | Raise Motion Flag | N/A | No Action | No Action | Listen = 9999 | Listen = 30 | Wait = 60 | Wait = 60 | No Action | Wait = 60 | Wait = 60 | No Action |
| Listen + No Wait | Raise Motion Flag | N/A | No Action | No Action | Listen = 9999 | Listen = 30 | Wait = 10 | Trigger = 60 | Trigger = 60 | Wait = 10 | Trigger = 60 | Trigger = 60 |
| No Wait | Raise Motion Flag | N/A | No Action | No Action | Listen = 9999 | Listen = 30 | No Action | No Action | No Action | No Action | No Action | No Action |
| None | Raise Motion Flag | N/A | No Wait = 60 | No Wait = 15 | Listen = 9999 | Listen = 30 | Wait = 60 | Wait = 60 | No Action | Wait = 60 | Wait = 60 | No Action |
| Motion | N/A | Lower Motion Flag | N/A | N/A | N/A | N/A | N/A | N/A | N/A | N/A | N/A | N/A |

FIG. 14B
EXAMPLE STATE PROCESS

| States (in order of precedence*) | | Events (Seated Patient) | | | | | | | | | | |
|---|---|---|---|---|---|---|---|---|---|---|---|---|
| | | Full Video Frame | | Upper Torso | | Lower Torso | | Upper 3 (Outer Torso Rail) | Upper 2 (Middle Torso Rail) | Upper 1 (Inner Torso Rail) | Lower 3 (Outer Torso Rail) | Lower 2 (Middle Torso Rail) | Lower 1 (Inner Torso Rail) |
| | | Active | Inactive | Active | Inactive | Active | Inactive | | | | | | |
| Trigger | | Raise Motion Flag | N/A | No Action | No Action | No Action | No Action | Active | Active | Active | Active | Active | Active |
| Wait | | Raise Motion Flag | N/A | No Action | No Action | No Wait = 60 | No Wait = 15 | No Action | No Action | No Action | No Action | No Action | No Action |
| Listen | | Raise Motion Flag | N/A | Listen = 9999 | Listen = 30 | No Action | No Action | Wait = 60 | Wait = 60 | Trigger = 60 | Wait = 60 | Wait = 60 | No Action |
| Listen + No Wait | | Raise Motion Flag | N/A | Listen = 9999 | Listen = 30 | No Action | No Action | Wait = 10 | Trigger = 60 | Trigger = 60 | Wait = 10 | Trigger = 60 | Trigger = 60 |
| No Wait | | Raise Motion Flag | N/A | Listen = 9999 | Listen = 30 | No Action | No Action | No Action | No Action | No Action | No Action | No Action | No Action |
| None | | Raise Motion Flag | N/A | Listen = 9999 | Listen = 30 | No Wait = 60 | No Wait = 15 | Wait = 60 | Wait = 60 | No Action | Wait = 60 | Wait = 60 | No Action |
| Motion | | N/A | Lower Motion Flag | N/A | N/A | | | N/A | N/A | N/A | N/A | | |

FIG. 15A
EXAMPLE STATE PROCESS

| 1st Half Torso | | Rest | No Wait | Listen + No Wait | Listen | Wait | Trigger | | 2nd Half Torso | | Rest | No Wait | Listen + No Wait | Listen | Wait | Trigger |
|---|---|---|---|---|---|---|---|---|---|---|---|---|---|---|---|---|
| | InActive | No Wait = 60 | | | | No Wait = 60 | | | | InActive | | | | Listen = 30 | Listen = 30 | |
| | Active | No Wait = 15 | | | | No Wait = 15 | | | | Active | | | | Listen | Listen = 30 | |
| 1st Half Torso Outer Rail | | Rest | No Wait | Listen + No Wait | Listen | Wait | Trigger | | 1st Half Torso Mid Rail | | Rest | No Wait | Listen + No Wait | Listen | Wait | Trigger |
| | InActive | | | | | | | | | InActive | | | | | | |
| | Active | Wait = 60 | Wait = 60 | | Wait = 10 | Wait = 60 | | | | Active | Wait = 60 | | | | Trigger = 60 | |
| 1st Half Torso Inner Rail | | Rest | No Wait | Listen + No Wait | Listen | Wait | Trigger | | 2nd Half Torso Outer Rail | | Rest | No Wait | Listen + No Wait | Listen | Wait | Trigger |
| | InActive | | | | | | | | | InActive | | | | | | |
| | Active | | | | | Trigger = 60 | | | | Active | Wait = 60 | Wait = 60 | | Wait = 10 | Wait = 60 | |
| 2nd Half Torso Mid Rail | | Rest | No Wait | Listen + No Wait | Listen | Wait | Trigger | | 2nd Half Torso Inner Rail | | Rest | No Wait | Listen + No Wait | Listen | Wait | Trigger |
| | InActive | | | | | | | | | InActive | | | | | | |
| | Active | Wait = 60 | | Trigger = 60 | Trigger = 60 | Wait = 60 | | | | Active | | | Trigger = 60 | Trigger = 60 | | |

FIG. 15B
EXAMPLE STATE PROCESS

| | | Rest | No Wait | Listen + No Wait | Listen | Wait | Trigger |
|---|---|---|---|---|---|---|---|
| 1st Half Torso | InActive | Listen = 30 | Listen = 30 | Listen = 30 | | | |
| | Active | Listen | Listen | Listen | | | |
| 1st Half Torso Outer Rail | InActive | | | | | | |
| | Active | Wait = 60 | Wait = 60 | | Wait = 10 | Wait = 60 | |
| 1st Half Torso Inner Rail | InActive | | | | | | |
| | Active | | | Trigger = 60 | Trigger = 60 | | |
| 2nd Half Torso Mid Rail | InActive | | | | | | |
| | Active | Wait = 60 | | | Trigger = 60 | Wait = 60 | |

| | | Rest | No Wait | Listen + No Wait | Listen | Wait | Trigger |
|---|---|---|---|---|---|---|---|
| 2nd Half Torso | InActive | No Wait = 60 | | | | No Wait = 60 | |
| | Active | No Wait = 15 | | | | No Wait = 15 | |
| 1st Half Torso Mid Rail | InActive | | | | | | |
| | Active | Wait = 60 | | Trigger = 60 | Trigger = 60 | Wait = 60 | |
| 2nd Half Torso Outer Rail | InActive | | | | | | |
| | Active | Wait = 60 | Wait = 60 | | Wait = 10 | Wait = 60 | |
| 2nd Half Torso Inner Rail | InActive | | | | | | |
| | Active | | | | Trigger = 60 | | |

FIG. 16A
EXAMPLE REST STATE TRANSITION RULES

| STATE(S) | LOCATION | EVENT | RULE STATE/TIME |
|---|---|---|---|
| Rest | 1st Half Torso | Active | No Wait = 60 |
| | | InActive | No Wait = 15 |
| | 1st Half Torso Inner Rail | Active | |
| | 1st Half Torso Mid Rail | Active | |
| | 1st Half Torso Outer Rail | Active | Wait = 60 |
| | 2nd Half Torso | Active | Listen |
| | | InActive | |
| | 2nd Half Torso Inner Rail | Active | |
| | 2nd Half Torso Mid Rail | Active | |
| | 2nd Half Torso Outer Rail | Active | Wait = 60 |
| | Outside Patient Torso | Active | |
| | | InActive | |
| | | | |

FIG. 16B
EXAMPLE WAIT STATE TRANSITION RULES

| STATE(S) | LOCATION | EVENT | RULE STATE/TIME |
|---|---|---|---|
| Wait | 1st Half Torso | Active | No Wait = 60 |
| | | InActive | No Wait = 15 |
| | 1st Half Torso Inner Rail | Active | |
| | 1st Half Torso Mid Rail | Active | Wait = 60 |
| | 1st Half Torso Outer Rail | Active | Wait = 60 |
| | 2nd Half Torso | Active | |
| | | InActive | |
| | 2nd Half Torso Inner Rail | Active | |
| | 2nd Half Torso Mid Rail | Active | Wait = 60 |
| | 2nd Half Torso Outer Rail | Active | Wait = 60 |
| | Outside Patient Torso | Active | |
| | | InActive | |
| | Wait Time | | Rest |

FIG. 16C
EXAMPLE NO WAIT STATE TRANSITION RULES

| STATE(S) | LOCATION | EVENT | RULE STATE/TIME |
|---|---|---|---|
| No Wait | 1st Half Torso | Active | |
| | | InActive | No Wait |
| | 1st Half Torso Inner Rail | Active | |
| | 1st Half Torso Mid Rail | Active | |
| | 1st Half Torso Outer Rail | Active | Wait = 60 |
| | 2nd Half Torso | Active | Listen + No Wait |
| | | InActive | |
| | 2nd Half Torso Inner Rail | Active | |
| | 2nd Half Torso Mid Rail | Active | |
| | 2nd Half Torso Outer Rail | Active | Wait = 60 |
| | Outside Patient Torso | Active | |
| | | InActive | |
| | No Wait Time | | Rest |

FIG. 16D
EXAMPLE LISTEN + NO WAIT STATE TRANSITION RULES

| STATE(S) | LOCATION | EVENT | RULE STATE/TIME |
|---|---|---|---|
| Listen | 1st Half Torso | Active | |
| | | InActive | |
| | 1st Half Torso Inner Rail | Active | |
| | 1st Half Torso Mid Rail | Active | |
| | 1st Half Torso Outer Rail | Active | |
| | 2nd Half Torso | Active | Listen + No Wait |
| | | InActive | Listen + No Wait = 30 |
| | 2nd Half Torso Inner Rail | Active | |
| | 2nd Half Torso Mid Rail | Active | |
| | 2nd Half Torso Outer Rail | Active | |
| | Outside Patient Torso | Active | |
| | | InActive | |
| No Wait | No Wait Time | | Listen |

FIG. 16E
EXAMPLE LISTEN STATE TRANSITION RULES

| STATE(S) | LOCATION | EVENT | RULE STATE/TIME |
|---|---|---|---|
| Listen | 1st Half Torso | Active | |
| | | InActive | |
| | 1st Half Torso Inner Rail | Active | Trigger = 60 |
| | 1st Half Torso Mid Rail | Active | Trigger = 60 |
| | 1st Half Torso Outer Rail | Active | Wait = 60 |
| | 2nd Half Torso | Active | |
| | | InActive | Listen = 30 |
| | 2nd Half Torso Inner Rail | Active | Trigger = 60 |
| | 2nd Half Torso Mid Rail | Active | Trigger = 60 |
| | 2nd Half Torso Outer Rail | Active | Wait = 60 |
| | Outside Patient Torso | Active | |
| | | InActive | |
| | Listen Time | | Rest |

US 9,318,012 B2

NOISE CORRECTING PATIENT FALL RISK STATE SYSTEM AND METHOD FOR PREDICTING PATIENT FALLS

CROSS-REFERENCE TO RELATED APPLICATIONS

The present application is related to and claims priority from the following co-pending U.S. patent applications: U.S. Provisional Patent Application No. 61/513,523, filed Jul. 29, 2011, entitled Noise Correcting Patient Fall Risk State System and Method For Predicting Patient Falls. The above identified application is incorporated by reference herein in its entirety.

This application is related to U.S. patent application Ser. No. 10/735,307 filed Dec. 12, 2003, now U.S. Pat. No. 7,477, 285, entitled Non-intrusive Data Transmission Network for Use in an Enterprise Facility and Method for Implementing, which is assigned to the assignee of the present invention. This application is also related to U.S. patent application Ser. No. 12/151,452 filed May 6, 2008, entitled System and Method for Predicting Patient Falls, which is assigned to the assignee of the present invention. This application is also related to U.S. patent application Ser. No. 12/589,654 filed Oct. 27, 2008, entitled System and Method for Documenting Patient Procedure, which is assigned to the assignee of the present invention. This application is also related to U.S. patent application Ser. No. 12/804,774 filed Jul. 29, 2010, entitled System and Method for Using a Video Monitoring System to Prevent and Manage Decubitus Ulcers in Patients, which is assigned to the assignee of the present invention. The above identified applications are incorporated by reference herein in their entirety.

BACKGROUND OF THE INVENTION

The present invention relates generally to a patient monitor. More particularly, the present invention relates to a system, method and software program product for analyzing video frames and determining the fall risk state of a patient by discriminating non-motion noise and non-dangerous motion from patient movements.

Fall reduction has become a major focus of all healthcare facilities, including those catering to permanent residents. Healthcare facilities invest a huge amount of their resources in falls management programs and assessing the risk of falls in a particular patient class, location, and care state, along with the risk factors associated with significant injuries. Recent studies have found fall rates at 2.2 to 7.0 (per 1000 patient bed days) in acute care hospitals, 11.0 to 24.9 in long-term care hospitals, and 8.0 to 19.8 in rehabilitation hospitals, with the majority of falls occurring from, or near, the patient's bed, usually by patients who should not ambulate without assistance. The patient's mental status is most often listed as the most common risk factor contributing to falls. Bed falls can account for up to half of all falls in a healthcare facility. The range of injury from all falls has been reported to be at a rate of 29 to 48 percent, with 4 percent to 7.5 percent resulting in serious injury to the patient. The intention of these studies is to improve patient care by providing adequate monitoring programs corresponding to the perceived patient risk and injury. Realistically, however, it is simply impossible to know for sure which patient will fall, and the severity of the injury that may result from any fall. Bed falls have received an extensive amount of scrutiny due to the patient's high expectation of safety and the disproportional potential for severe injury to the patient over other types of falls.

Round the clock patient monitoring by a staff nurse is expensive, therefore, healthcare facilities have investigated alternatives in order to reduce the monitoring staff, while increasing patient safety. In the past, patients at risk of falling from their beds were either physically restrained or sedated, regardless of the patient's mental status. Both of these preventives are now considered to be measures of last resort that are reserved for unruly or incompetent patients. Presently, falls prevention is subdivided into intervention and monitoring techniques. Interventions are aimed at minimizing falls risk and include such measures as ensuring that the patient can reach necessary items from the bed, ensuring that the bed is in a low position and the bed brakes are locked, ensuring that the patient has a manual bed call button within reach for summoning a nurse and that a charge nurse responds (albeit verbally) to every call. Other interventions include the use of half length bedrails to reduce the patient's need to climb over rails to exit the bed and keeping the bedside area uncluttered and obstacle free. Perhaps the most easily implemented intervention is clear instructions from an attending nurse to request assistance prior to leaving the bed.

Healthcare facilities rely on patient monitoring to supplement interventions and reduce the instances of patient falls. Eyes-on monitoring of patients is problematic for two reasons, cost and privacy. Most facilities maximize the patient-to-nurse staffing ratios by care units, e.g., recovery and critical care units have a lower patient-to-nurse staffing ratio than floor bed units, and, typically, bed patients demand greater privacy than those in critical or special care units. For these reasons, patient monitoring has relied on technological solutions rather than nurse monitoring. Note however, that these solutions are alerting devices, used as an aid for patient care and are not a substitute for adequate quality staffing.

Prior art fall prevention monitors include alarms using pressure sensitive pads or position sensitive transmission patches. The first type of fall prevention monitor uses a pressure sensitive pad that senses the patient's body mass. If the sensor detects a change in the patient's body mass, a remotely located alarm is sounded to summon staff. These monitors are extremely adaptable and may be placed in one or more locations on the patient's bed, on the floor adjacent to the bed, on chairs, toilet seats, wheel chairs and almost any other place that a patient may rest. These devices have gained considerable acceptance in the healthcare industry because they are relatively inexpensive, non-intrusive, exhibit a fairly low instance of false alarms and are reliable. These monitors can be used in tandem to more accurately assess the position of a patient, thereby further reducing false alarms. For instance, the system may be configured with one pressure sensitive pad in the bed and under the patient and a second pressure sensitive pad on the floor. Then, the staff will be alerted whenever a patient's weight shifts off of the bed pad and again when the patient's weight is sensed by the floor pad.

Detractors to pressure sensitive fall prevention monitors counter that these types of devices may be more accurately described as "patient fall detectors" than "fall prevention monitors" because they typically alert only after a fall has occurred and the patient's weight has shifted out of the bed. In other words, prior art pressure sensitive fall monitors cannot perceive that the patient is in the process of getting out of bed, only that the patient's weight has left the bed. Additionally, poorly placed pressure sensitive pads may send multiple nuisance alarms that must be responded to and then to reposition the pressure sensitive pad requires that the bed be empty.

More recently, patient position sensitive transmission patches have been introduced that sense the position of a body part and send an alarm if the part is in a "near weight bearing position." The "patch" is a battery powered inclinometer, processing circuitry and a transmitter enclosed in an adhesive patch that is used in conjunction with a wireless receiver and alarm. The patch may be applied to the back of a patient's thigh parallel with the femur. Whenever the patient's thigh is approaching a weight bearing angle, the patch sends an alert signal to the remote receiver and an alarm sounds. These position sensitive transmission patches are relatively inexpensive and can be worn continuously for up to three weeks. The downside is battery life. The transmission patch device is essentially in a sleep mode when the patch is horizontal and consumes relatively little power, however when the patch is oriented off horizontal, the inclinometer and associate electronics are continuously processing measurements. Alert transmissions consume even more battery power.

Recently however, video programs have been introduced for alerting healthcare professionals of a patient's fall from a video surveillance system. Many patient rooms now contain video surveillance equipment for monitoring and recording activity in a patient's room. Typically, these video systems compare one video frame with a preceding frame for changes in the video frames that exceed a certain threshold level. These may be taking from the color, luminance or any other attribute of the video frame. If the condition is met, the system automatically flags the frame as having motion and may save it for further review or archive, or alternatively it may alert the healthcare professional to potential patient movement in the patient's room. More advanced systems identify particular zones within the patient room that are associated with a potential hazard for the patient. Then, sequential video frames are evaluated for changes in those zones. If the system detects a change in one of the zones, the system assumes that the patient has entered the zone. Typically, these zones are associated with areas within the patient's room that are associated with a patient fall, such as the floor or lavatory area, or near a sink, toilet, chair or bed where a patient may land after a fall. In those systems, the healthcare professional is immediately alerted if the motion is detected in the danger zones and this is indicative of a patient fall. The healthcare professional can then assist the patient to his feet or summon emergency assistance as necessary. While these systems alleviate the healthcare professional of some of the burden of monitoring the patient, they suffer from the shortcoming of being essentially reactive, alerting the staff only after an event as occurred.

An improved video monitoring system is disclosed in U.S. patent application Ser. No. 12/151,452 filed May 6, 2008, entitled System and Method for Predicting Patient Falls. That system differs from the prior art in that it analyzes the surveillance video frames for patterns of motion. It is essentially a two-tier method. First, it evaluates changes between video frames in a patient's room for patterns that could only be attributed to the patient, thus it discriminates motion in the room, or motion that is not the patient moving. Second, the predictive system attempts to identify patient movement that is a precursor to a patient fall. Certain movements by the patient have no predictive value to the system and are, therefore, discarded from further evaluation. Other patient movement may indicate that the patient will attempt a dangerous movement, one that might result in a patient fall. This movement is not necessarily a fall, but movement that will likely precede a fall. Thus, it is not necessarily that the patient has been detected moving, or where in the room the motion is detected, but how and where that patient movement relates to other motion attributed to the patient. This is achieved by recognizing patterns of patient movements that are precursor movements to a patient fall. Essentially, a plurality of patient movement signatures are compiled and saved in the system. Then, once the system has detected motion in the patient room that may be the patient moving around, the character of that patient movement is saved. As more patient movements are detected, the character of those movements is saved with the previously detected patient movement. Patterns of patient movement accrued over time are compared to the patient movement signatures. If the movement pattern compares favorably to a signature that has been identified as a precursor to a patient fall, the healthcare professional is immediately alerted, who then intervenes before the patient falls. Typically, the healthcare professional audibly warns the patient of the danger and simultaneously hurries to the patient's room.

While the predictive patient fall system has been demonstrated to be extremely useful in reducing the frequency of patient falls in a healthcare facility, generally the system errs on the side of caution. Recognizing patient movement that is predictive of a patient fall is valuable if the movement patterns correlate to patient movement signatures that occur well in advance of the fall, at least with sufficient time for the healthcare professional to successfully intervene. Furthermore, movement signatures that do not necessarily result in a patient fall are of extreme importance to the system, even though the likelihood of a fall is somewhat remote. Once the patient traverses the final stages of a fall, there is much less opportunity of the healthcare professional to successfully intervene and far less likely of a satisfactory outcome. Hence, the library of patient movement signatures compiled with many movement signatures that will almost never be satisfied, i.e., compare favorable to a pattern of patient movement detected by the system. In many cases, the system will recognize two or more patterns of patient movement from the surveillance video that partially match one or more fall prediction movement signatures. Hence, any changes detected between video frames that complete a movement pattern that matches a fall signature will result in an alert being sent to the healthcare professional.

As should be appreciated, because the predictive system may have identified multiple patient movement patterns that are similar, but not a match to a fall signature, any changes between video frames that complete one of the movement patterns matching a fall signature will result in an alert, regardless of the source of the changes. Any patient movement that completes a movement pattern matching a fall signature must be investigated by an attending healthcare professional. For the most part, these patient movements are merely the patient attempting to do something that requires assistance, such as getting out of a chair, out of a tub, out of bed, off a gurney, etc., regardless of whether or not the patient intends to make such a movement or not. Typically, the video fall prediction system may issue a plurality of alerts to the attending healthcare professionals for patient movement that never culminates in a patient attempt to do something that requires assistance. Regardless, each of these alerts must be investigated by the attending healthcare professional. However, other events may occur that are not related to patient movement that may also be interpreted, incorrectly, as a change in the video that completes one or more patient movement patterns matching a fall prediction movement signature. Typically, these "false alarms" are attributed to spurious noise in the system. Noise may result from electrical noise on electrical components, light noise on light receptors, or some combination of the two. These false alarms greatly increase the amount of work for healthcare professionals charged with patient care above the number of valid alerts that must be investigated by the professional. The continued or frequent issuance of false alarms ultimately results in healthcare professionals being less vigilant in their patient monitoring and response to fall alerts.

BRIEF SUMMARY OF THE INVENTION

The present invention is directed to a system, method and software product for predicting patient falls from noise corrected surveillance video by identifying patient fall risk states. The present system evaluates each video frame received from a surveillance camera to determine a discrete fall risk state based on changes in the current video frame from previous video frames. Typically, the surveillance camera monitors a patient's room or similar area where falls are likely to occur. The intent is to define a hierarchy of discrete patient fall risk states that describes a patient fall risk which the system enters based on detecting changes in patient body areas of a video frame.

While a system may utilizes any number of discrete states, the plurality of discrete states generally range from a low or 'no fall risk' state, to an intermediate fall risk state, up to a critical fall risk state where some type of action is mandated by the system in order to avoid a patient fall, usually the issuance of an alert. The present noise correcting patient fall risk state prediction system transitions from one state to the next based on changes detected between a current video frame and a background frame.

Typically, a video frame is subdivided into multiple predetermined areas for evaluation. At least two of the predetermined areas contain images of body parts of the patient. That is, image portions of the video frame are bound to patient body parts and not just to 'danger areas' of the patient's room. By subdividing the patient's image into discrete body parts, specific fall risk state transition rules can be assigned to each body part and area. Changes detected in an area of the video frame containing a specific part can more accurately assess a risky patient movement (that is, identified as a precursor movement to a patient fall). Moreover, several sets of fall state transition rules can be compiled and implemented based on the patient's body position and orientation. For example, the patient's body might be subdivided in the video frame as an upper torso body part and a lower torso body part. However, different sets of fall state transitions rules are used depending on whether the patient is sitting, standing or lying down and/or the patients orientation to the surveillance camera.

These predetermined areas may also include other areas that are within the patient's range of motion, but outside the body part areas defined in the video frame. These areas are linked to patient movements that may originate from the patient body parts bound in the other areas discussed above. Appropriate fall risk state transition rules also correspond to these outlier areas. For example, a plurality of torso rail areas may be defined within the range of motion of the patient's body parts, and proximate to the torso areas, but such that the patient's image is not typically within any of the rail areas under lower fall risk states. Changes detected within these predetermined areas may, based on the current fall risk state of the patient and the specific fall state transition rules for the patient's position, cause the system to enter into an elevated fall risk state.

The number of false alarms which are prevalent in prior art systems are greatly reduced in present noise correcting patient fall risk state prediction system by accurately defining fall risk state transition rules and by reducing the opportunity for noise to impact the state transition results. It is important to issue a fall alert on the first video frame in which a patient movement is detected that can be unequivocally identified as a possible precursor movement to a patient fall. However, some apparent motion, or apparently risky movement, detected within a frame may be the result of non-risky behavior, movement by others in the room or noise. Most non-risky movement within the video frame can be readily excluded from risky patient movements by close adherence to the hierarchy of patient fall risk states and the fall risk state transition rules. In other words, the fall risk state prediction system should transition between one or more fall risk states before reaching a critical fall risk state that requires the issuance of an alarm. Motion detected within the video frame that is proximate to the patient, for instance within an area of the frame that the prior art systems would categorize as a high risk area, will not necessarily be interpreted as a high risk movement by the patient, unless the system is operating in an intermediate fall risk state that allows for a transition into a critical fall risk state.

System noise is dealt with separately to the fall risk state processing. One noise reduction technique utilized by the present invention is to reduce the sample time to a sample interval that exceeds that typical duration of noise. However, because noise is often associated with only a single video frame, a brute force reduction in the sampling rate will not necessarily result in the issuance of fewer false alarms. The present noise correcting patient fall risk state prediction system overcomes the noise problem by identifying what appears to be new movement within a video frame (changes detected between the current video frame and the previous background video frame) and then excluding the first video frame with new movement (changes) from fall risk state processing. That is, the first video frame that might cause the system to enter an elevated fall risk state is not fall risk state processed. If the changes detected within the frame are a result of movement and not noise, the changes will be present on successive video frames. As a practical matter, the issuance of a patient fall alert is postponed for the duration of only a single frame, usually on the order of 0.042 sec for 24 fps sampling. These comparisons are made on an area-by-area to correspond with the fall risk state transition rules. In so doing, only changes detected within an area can be attributed to noise, not changes detected somewhere within the video frame itself.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 2 is a diagram depicting the physical layout and logical topology of a healthcare facility (HCF) as may utilize the present invention;

FIG. 3 is a video viewport of a patient room as viewed by a healthcare provider on a display at computer 112 in accordance with exemplary embodiments of the present invention;

FIG. 4 is a flowchart of a prior art method for determining patient movement that may be attributable to a patient fall;

FIG. 5 is a flowchart of a generic method for predicting a patient fall using state information in accordance with an exemplary embodiment of the present invention;

FIG. 7 is a flowchart depicting a manual setup method for implementing a state process for predicting patient falls in accordance with an exemplary embodiment of the present invention;

FIG. 8 is a flowchart depicting an automated setup method for implementing a state process for predicting patient falls in accordance with an exemplary embodiment of the present invention;

FIGS. 9A and 9B depict a patient body feature binding method in accordance with an exemplary embodiment of the present invention;

FIG. 10 is a flowchart depicting a method for binding patient body features to the video space for implementing a state process for predicting patient falls in accordance with an exemplary embodiment of the present invention;

FIG. 11 is a flowchart depicting a noise reduction method for processing video frames in a state process for predicting patient falls in accordance with an exemplary embodiment of the present invention;

FIG. 12 is a flowchart depicting a detailed state processing method for predicting patient falls in accordance with an exemplary embodiment of the present invention;

FIG. 13A through 13D are flowcharts depicting a detailed video processing method for frames in a state process for predicting patient falls in accordance with an exemplary embodiment of the present invention;

FIG. 14 is a chart illustrating a state hierarchy with the state rules for a recumbent patient associated events detected for a patient body area in accordance with an exemplary embodiment of the present invention;

FIG. 15A through 15B are diagrams depicting exemplary state rules for events occurring in specifying patient body areas patient body in accordance with an exemplary embodiment of the present invention; and FIG. 16A through 16E are diagrams depicting correlations between state rules and patient body areas for states in accordance with an exemplary embodiment of the present invention.

Figure 1:
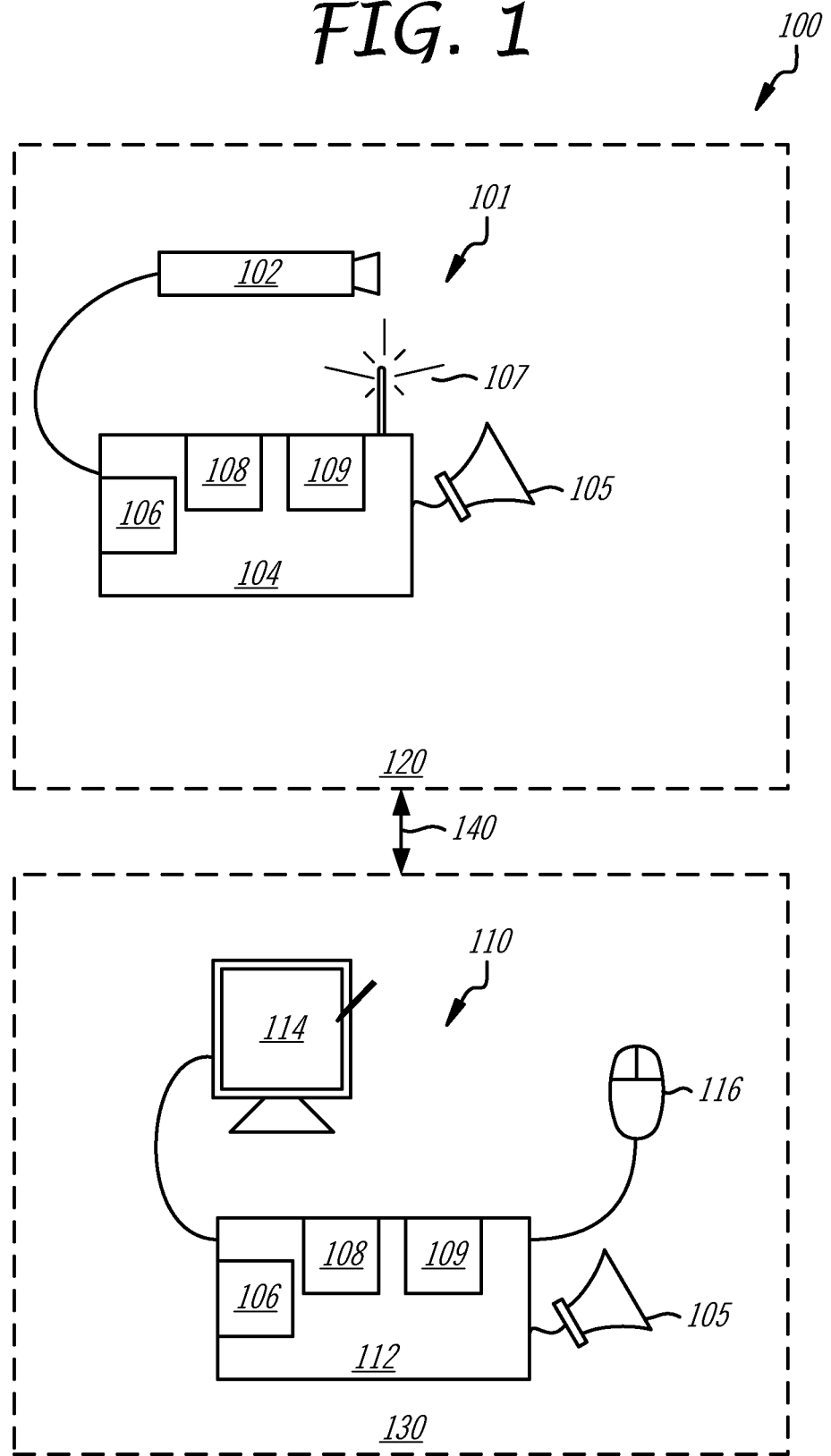
FIG. 1 is a diagram of a patient fall prediction system in accordance with exemplary embodiments of the present invention.

Other features of the present invention will be apparent from the accompanying drawings and from the following detailed description.

DETAILED DESCRIPTION OF THE INVENTION

| Element Reference Number Designations |
|---|
| 100: Patient monitoring system |
| 101: Patient monitoring device |
| 102: Video camera |
| 104: Camera control device |
| 105: Audible alarm |
| 106: Processor |
| 107: Receiver/interrogator |
| 108: Memory (RAM and ROM) |
| 109: Video processor |
| 110: Nurse monitor device |
| 112: Computer (PC, laptop, net device) |
| 114: Display (touch-screen) |
| 116: User interface device (mouse) |
| 140: Distribution network |

-continued

| Element Reference Number Designations |
|---|
| 210: PC |
| 220: Patient room |
| 221: Bed |
| 222: Chair |
| 230: Care (Nurse) station |
| 241: Transmission medium |
| 242: Network switch |
| 243: Broadband connection |
| 245: Patient administration |
| 246: Network server/router/firewall |
| 300: Video frame |
| 900: Patient |
| 902: Front patient view |
| 904: Side patient view |
| 910: $1^{st}$ Half torso |
| 912: $1^{st}$ Half torso inner rail (left) |
| 914: $1^{st}$ Half torso mid rail (left) |
| 916: $1^{st}$ Half torso outer rail (left) |
| 922: $1^{st}$ Half torso inner rail (right) |
| 924: $1^{st}$ Half torso mid rail (right) |
| 926: $1^{st}$ Half torso outer rail (right) |
| 950: $2^{nd}$ Torso half |
| 952: $2^{nd}$ Half torso inner rail (left) |
| 954: $2^{nd}$ Half torso mid rail (left) |
| 956: $2^{nd}$ Half torso outer rail (left) |
| 962: $2^{nd}$ Half torso inner rail (right) |
| 964: $2^{nd}$ Half torso mid rail (right) |
| 966: $2^{nd}$ Half torso outer rail (right) |

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

One area of particular concern for healthcare facilities is patient falls, particularly from the patient's bed. Typically, a healthcare facility is subdivided into corridors of patient rooms with a centrally located care station (the nurse's station) responsible for a group of rooms. The care station is usually connected to each patient room by at least an intercom system. Each room has a call device that triggers an audible alert at the care station, usually coupled with visual room identification indicia at the care station. Normally, at least one healthcare professional remains in the care station to monitor the patient call system while others go about their routines in and out of patient rooms and other areas of the facility. Patients who should not ambulate without assistance are instructed to call for assistance as they are prone to bed falls, although virtually every patient is at some risk of a bed fall. Patients do not, or sometimes cannot, follow instructions which results in falls and possible injuries. Motion detectors, while helpful in detecting patient movements that might result in a fall, tend to generate a disproportionately high percentage of false alarms. Responding to multiple false alarms tends to desensitize healthcare professionals to the perceived risk of a patient fall. Pressure sensitive pad patient monitors are at the other extreme, that is, they tend to alert only after the patient is in an unsteady state and in the process of falling, such as when the patient's weight shifts from the bed during egress. Once in an unsteady state, it is difficult for a healthcare professional to respond before the patient falls. Patient position sensitive transmission patches alert the professional whenever the part of the patient's body having the pad rotates at a particular angle indicating that the patient is attempting to move into a more vertical position. These systems cannot detect certain critical patient movements that precede a fall, such as a patient rolling off a bed in a generally horizontal attitude or falling backwards from a sitting position off the bed. Furthermore, the latter two devices generally require installing of standalone fall detection equipment.

Recently, the U.S. Congress adopted Public Law No: 110-202 entitled "Keeping Seniors Safe From Falls Act of 2007" for identification, analysis, intervention and rehabilitation of persons at risk of falling. This law may mandate minimal standards for patient fall care and monitoring. What is needed is a patient fall prediction system that detects patient activity in situations indicative of a probable fall and generates an alert prior to the fall event, thereby allowing the healthcare professionals sufficient time to react before the actual fall. Optimally, the system could be incorporated in technology existing in the healthcare facility and should be adaptable for monitoring for patient falls under a variety of conditions.

The present invention generally relates to patient monitoring using captured video image frames of the patient for detecting circumstances in which the patient is at an elevated risk of falling. Video monitoring of patient activity is known, such as described in U.S. patent application Ser. No. 10/735, 307 filed Dec. 12, 2003 by Johnson and entitled Non-intrusive Data Transmission Network for Use in an Enterprise Facility and Method for Implementing. The aforementioned Johnson application also describes detecting patient movements by analyzing sequential frames of video images for changes. A video monitor camera system is installed in the patient's room and aimed at an area of interest in the room, such as at the patient. Sequential image frames are compared for differences that indicate motion. Once detected, the system flags the sequence of images for local storage that can be remotely retrieved at a later time. Furthermore, the Johnson application describes techniques for filtering out unimportant motion in the frame and concentrating on only relevant areas of the image, such as the patient's bed, the area proximate to the patients bed or any other area in the patient's room, thereby saving only the video sequences that are relevant. While these stored video sequences are an important supplement to medical records, the patient monitoring system stores all sequences in which motion is detected without regard to the patient's risk of falling.

Predicting patient falls through video monitoring of patient activity is also known, such as described in U.S. patent application Ser. No. 12/151,452 filed May 6, 2008, by Johnson and entitled System and Method for Predicting Patient Falls. Certain types of motion detected in a patient room from the analysis of video frames can be correlated to motion comprising patient movement signatures that are precursors to a patient fall. This type of patient fall prediction system can be implemented in a facility's existing surveillance monitoring system. The system includes at least one surveillance camera positioned in the patient's room for observing the patient. Typically the healthcare professional is stationed remotely from the patient room and monitors the system at the remote. In set up phase, the viewpoint of the camera is oriented toward an area in the room associated with elevated risk of patient falls, such as a bed, chair, wheelchair or shower. The patient will be located in this area. The healthcare professional obverses the room setting on a monitor and identifies an area in the viewport frame that will be monitored for patient falls. This area is typically the origin of patient movement and the general location of the patient in the viewport. Next, the healthcare professionals defines specific areas on the display that are associated with elevated risk for falling, usually by graphically marking these risk areas on the display screen. These high risk areas include the edges of a bed or chair, the side of a tub, a shower entry, or even an entryway threshold. Alternatively, these high risk areas may be identified automatically through a pattern recognition procedure implemented in the video system. Once identified by the professional, the patient fall prediction system monitors high risk areas for motion and correlates patterns of detected motion to known motion detection signatures. Some detection signatures represent general motion that does not correspond to patient falls, while others represent patient fall signatures, that is movement that is a precursor to a patient fall. When a detection pattern correlates to a fall detection signature, a fall alert is immediately transmitted to the healthcare professional at the remote location.

Motion patterns are detected through the use of concurrent detection zones that are delineated adjacent to graphic markings of the risk areas made by the healthcare professional. The purpose of the detections zones is to predict patient falls based on the direction of motion detected across the detection zones. Detection patterns indicating an inward motion toward the patient are not precursors to falls and are usually ignored. Conversely, motion detection patterns indicative of motion away from the origin, outward from the patient, are indicative of a high risk patient movement that may be a precursor to a fall. These outward patient movements are detected as sequential motion across the set of detection zones beginning with the innermost zone, then through the internal detection zones of the set and finally are detected in the outermost detection zone last (i.e., motion is detected chronologically from the innermost motion detection zone to the outermost zone). Once matched to a fall detection signature, a fall alert is immediately transmitted to the healthcare professional.

One shortcoming of the prior art patient fall prediction system is the amount of processing power required by the system for tracking movement patterns. Depending on the number of zones created within the patient's room, the prior art patient fall prediction system may detect and simultaneously track several hundred or more motion patterns resulting from changes being detected in the concurrent detection zones. Each of the patterns must be constantly updated with results from the most current video frame, and those updated patterns tested against (fall prediction) patient movement signatures that are precursors to a patient fall from a library of signatures. In addition, motion detected in each video frame commences new motion patterns for tracking. Obviously, identical motion patterns are consolidated and some motion patterns will correlate to non-fall related patient movement and while other patterns stagnate, each of those types can then be discarded. However, overall the tracking process can be daunting and the number of possible permeations for matching can be unwieldy.

Another shortcoming of the prior art patient fall prediction system is the frequency of "false alerts" generated by the system. A false alert, for the purposes of the present invention, is an alert that has no basis on motion being detected within the patient room. False alerts may occur for a variety of reasons, however the most prevalent is the existence of noise that is incorrectly interpreted as a change between video frames, which is further misinterpreted as patient movement that concludes a movement pattern that matches a fall prediction signature. False alerts resulting from noise need not be investigated by the attending healthcare professional, however the professional has no means for discriminating false alarms generated by noise from other patient alerts.

Before discussing the present invention in detail, it should be appreciated that the physical structure of the device may take many forms and operate in a variety of modes without departing from the intended scope of the invention. A brief description of several structural exemplary embodiments is discussed immediately below. FIG. 1 is a diagram of a patient fall prediction system in accordance with exemplary embodiments of the present invention. As depicted in the figure, patient fall prediction system 100 generally comprises patient monitoring device 101 and nurse monitor device 110. Patient monitoring device 101 captures video images of a portion of the patient's room 120 via camera 102, which is coupled to camera control device 104. Camera 102 should be at least of medium quality, produce a stable video output of 300 lines of resolution or greater and have infrared illumination or quasi night vision for operating in extremely low light conditions. Additionally, video camera 102 should have a relatively fast shutter speed to capture relatively fast motion without blurring at frame rates of 20 fps or above. In accordance with one exemplary embodiment of the present invention, video camera 102 is an infrared (IR) device which senses changes in the IR portion of the visible light spectrum. In so doing, the system is less susceptible to "light noise" or interference caused by changes in light sources within the patient's room such as the television, room light, patient monitors and monitoring equipment, etc. Alternatively, video camera 102 may comprise multiple video sensors for different purposes. For instance, video camera 102 may comprise an IR camera for monitoring changes in the patient room for determining movement and predicting patient falls and a second camera, for instance a high definition (HD) camera, for transmitting video images of the room to an attending healthcare professional and archiving, when appropriate, video images to storage for future evaluation.

Camera control device 104 processes the video images received from camera 102 in accordance with the fall prediction methodology. As such, camera control device 104 includes processor 106, memory 108 and optional video processor 109. Camera control device 104 may be a special purpose device configured specifically for patient monitoring, such as the set-top control and camera control devices described in the Johnson application identified above or, optionally, may be a generic personal computer (PC). In either case, memory 108 includes both ROM and RAM type as necessary for storing and executing fall prediction program instructions and a high capacity memory, such as a hard drive for storing large sequences of video image frames. Additionally, camera control device 104 may be fitted with a high capacity flash memory for temporarily storing temporal image frames during image processing and/or prior to more permanent storage on a hard drive or at a network location. Optional video processor 109 may be a dedicated image processor under the control of an application routine executing on processor 106, or may be logic operating in processor 106. Under the fall prediction routines, video processor 109 analyzes portions of sequential images for changes in a particular area which correlate to patient movements that are precursors to a fall. Patient monitoring device 101 may be coupled to nurse monitor device 110 located in nurses station 130 via distribution network 140, for transmitting surveillance images of the patient's room and fall risk state information to nurse monitor device 110. Optionally, audible alarm 105 may be provided for alerting healthcare professionals that camera control device 104 has detected that the patient is at risk of falling. Additionally, camera control device 104 comprises other components as necessary, such as network controllers, a display device and display controllers, user interface, etc.

In many regards, nurse monitor device 110 may be structurally similar to camera control device 104, however its primary functions are to set up the fall prediction routines running at camera control device 104 and to monitor fall risk state information and surveillance video provided by patient monitoring device 101. Optimally, nurse monitor device 110 is connected to a plurality of patient monitoring devices that are located in each of the patient rooms being monitored at the nurse's station. Nurse monitor device 110 generally comprises computer 112 coupled to display 114. Computer 112 may be a personal computer, laptop, net computer, or other net appliance capable of processing the information stream. Computer 112 further comprises processor 106, memory 108 and optional video processor 109, as in camera control device 104, however these components function quite differently. In setup phase, a healthcare professional views the patient room setting and graphically defines areas of high risk for a patient fall, such as the patient bed, chair, shower, tub, toilet or doorways. The graphic object may be manipulated on display 114 by user gestures using resident touch screen capabilities or the user gestures may be entered onto a display space using mouse 116 or other type of user interface through a screen pointer (not shown). That information is passed on to patient monitoring device 101 which monitors the selected area for motion predictive of a movement that is a precursor to a patient fall. When patient monitoring device 101 detects that the patient is at high risk of falling, the fall risk state is immediately transmitted to nurse monitor device 110, which prioritizes the information over any other routine currently running as an alarm. This is accompanied by an audible alarm signal (via audible alarm 105). The healthcare provider can then take immediate response action to prevent a patient fall.

In accordance with other exemplary embodiments of the present invention, patient monitoring device 101 may operate independently, as a self-contained, standalone device. In that case, patient monitoring device 101 should be configured with a display screen and user interface for performing setup tasks. Audible alarm 105 would not be optional. In accordance with still another exemplary embodiment, patient monitoring device 101 may comprise only video camera 102, which is coupled to nurse monitor device 110 at a remote location. In operation, camera 102 transmits a stream of images to nurse monitor device 110 for video processing for fall prediction. It should be appreciated, however, that often high volume traffic on distribution networks, such as sequences of video images, experience lag time between image capture and receipt of the images at the remote location. To avoid undesirable consequences associated with lag, the distribution network bandwidth should be sufficiently wide such that no lag time occurs, or a dedicated video path be created between nurse monitor device 110 and patient monitoring device 101. Often, neither option is practical and therefore, the video processing functionality is located proximate to video camera 102 in order to abate any undesirable lag time associated with transmitting the images to a remote location.

In addition, patient fall prediction system 100 may comprise a deactivator for temporarily disabling the patient fall prediction system under certain conditions. In the course of patient care, healthcare professionals move in and out of patient rooms and in so doing, solicit movements from the patients that might be interpreted as a movement that proceeds a patient fall by the patient fall prediction system. Consequently, many false alarms may be generated by the mere presence of a healthcare professional in the room. One means for reducing the number of false alarms is to temporarily disarm the patient fall prediction system whenever a healthcare professional is in the room with a patient. Optimally, this is achieved through a passive detection subsystem that detects the presence of a healthcare professional in the room, using, for example, RFID or FOB technology. To that end, patient monitoring device 101 will include receiver/interrogator 107 for sensing an RFID tag or FOB transmitter. Once patient monitoring device 101 recognizes a healthcare professional is in the proximity, the patient fall prediction system is temporarily disarmed. The patient fall prediction system will automatically rearm after the healthcare professional has left the room or after a predetermined time period has elapsed. Alternatively, the patient fall prediction system may be disarmed using a manual interface, such as an IR remote (either carried by the healthcare professional or at the patient's bedside) or a dedicated deactivation button, such as at camera control device 104 or in a common location in each of the rooms. In addition to the local disarming mechanisms, the patient fall prediction system may be temporarily disarmed by a healthcare professional at care station 130 using computer 112 prior to entering the patient's room.

Before describing the generic process a brief description of video capture data might be helpful. Generally, a typical video camera captures a sequence of digital video frames, each at a predetermined resolution, at a predetermined frame rate, for instance sixteen, twenty, twenty-four and even up to thirty-six frames per second. The resolution of digital cameras is usually defined by the number of pixels both horizontally and vertically (such as 640×480) or as a total number of pixels in the image (such as 1.4 mega pixels), while the resolution of analog video cameras is typically defined by the number of television lines, for instance 320 lines. Most prior art digital video cameras used for surveillance applications have a relatively low resolution, in the range of 640×480 pixels, however the resolution is often dependent on the application and the size of the surveillance area in the field of view of the camera. For instance, a larger surveillance area might necessitate the use of a higher resolution camera in order to recognize objects in the field of view. As patient rooms in a HCF are relatively small, adequate surveillance video has been achieved using relatively low resolution cameras. Maintaining resolutions as low as possible is often important because the A/V traffic on network 240 often creates bottlenecks for other, sometimes more important, network traffic data (see generally U.S. Pat. No. 7,477,825 discussing techniques for handling A/V network traffic). Hence, video resolution often suffers for the sake of network flow.

Furthermore, for the purposes of describing the video processing and analysis techniques below, it should be appreciated that each pixel of the 1.4 mega pixel exemplary frame alluded to above, is defined by two optical characteristics: chrominance and luminance. Using luminance and chrominance image encoding, each pixel of a frame is allocated a predetermined number of bits for describing the pixel, for instance a 12 bit pixel encoding in the YUV12 planar pixel encoding devotes 8 bits to the Y, or luminance channel, and the remaining 4 bits allocated for the chrominance of a 2×2 pixel block. In any case, the chrominance bits describe the pixel's color (or the coordinates of the color in some predetermined color space), while the luminance bits describe the intensity of the light. Hence, chrominance pixel characteristics may be extremely useful in recognizing a patient in a video frame by skin tone, or other bodily colorations. However, the use of chrominance pixel characteristics is susceptible to changes in the ambient brightness of the surveillance area, as the ambient light in the area diminishes, the chrominance bits fall within a narrow range of color coordinates in the color gambit, typically near the gray scale. While it may still be possible to distinguish the patient from the surrounding area using contrasts in the chrominance characteristics of the pixels in the video frame, the process is far more difficult and less reliable.

Luminance pixel characteristics, on the other hand, are far less susceptible to changes in the ambient brightness of the surveillance area for two reasons. The amount of light reflected off a surface (the luminance value) is highly influenced by the distance from the light source in the surveillance area and that distance can be generally referenced to a patient's position in a surveillance area. Assuming illumination in a patient's room is provided by one or both of an overhead room light and a video camera equipped with infrared illumination elements that are generally arranged around the lens and oriented toward the view axis of the camera (i.e., coaxial to the camera's view axis).

While evaluating the luminance characteristics has some advantages over using chrominance characteristics, and vice versa, the present noise correcting patient fall risk state prediction system using generic video analysis is not necessarily dependent on the luminance characteristics, chrominance characteristics or some other pixel characteristic. Hence, luminance and chrominance will be generally referred to throughout as color, or color information or weight of a pixel, group of pixels, area of the image frame, etc.

FIG. 3 is a diagram depicting the physical layout and logical topology of a healthcare facility (HCF) as may utilize the present invention. The HCF is typically configured with a plurality of patient rooms 220 and one or more care station 230 statistically located for servicing a predetermined number of rooms in the vicinity. Patient rooms 220 are usually identical in size, design and layout with similar furnishings. An exemplary room will have an egress door, a lavatory door and walls. Furnishings of patient room 220 typically include bed 221, more chairs 222 and other optional patient furniture such as a night stand, dresser, table, etc. In accordance with exemplary embodiments of the present invention, patient room 220 will also include patient monitoring device 101 for monitoring patient movements. Each patient monitoring device 101 is connected to distribution network 140 for sending and receiving programming instructions, video frames, patient fall risk state information and other types of media and data. As depicted in the figure, distribution network 140 is pervasive across the HCF including patient rooms 220, care station 230, administration sites 245 and network system administrations 248. Distribution network 140 includes a plurality of data paths comprising any type of medium for data transmission. For instance, data transmission medium 241 may be a wired network, e.g., twisted conductor pairs of conductor, coaxial, optical or wireless signals, each using appropriate data transmission equipment and transmission protocols for transmitting data and video images. Depending on the data transmission medium 241 selected for use, distribution network 140 may be implemented of the HFC's existing Ethernet WAN, CATV network, power supply (110 VAC/220 VAC power lines) or wireless WAN.

Distribution network 140 further comprises network switches 242, firewall/servers 246 and computers 212 which may be personal computers, laptops, net computers, or other net appliances capable of processing the information stream, and may be connected to the Internet via high speed line 243. In accordance with one exemplary embodiment of the present invention, computers 212 will be optionally coupled to touch-screen displays capable of receiving and echoing user gestures in display space (see nurse monitor device 210).

Before discussing the present invention in greater detail, it will be helpful to view a typical patient room from a viewpoint perspective of a video image. FIG. 3 is video viewport 300 of patient room 220 as viewed by a healthcare provider on a display at computer 212. Patient room 220 can be seen the side walls, ceiling and floor. Along one wall is an entry door and a bathroom door and containing various furnishings: bed 221, chair 222 and a night stand. Clearly, any patient monitoring system should have the flexibility to adapt to all different room configurations in the HCF.

Before discussing the present patient fall risk state prediction system and method, it may be beneficial to briefly discuss a generic prior art patient fall detection method as depicted in FIG. 4. Typically, prior art patient fall alert systems continually monitor areas surrounding a patient for motion, these areas are usually designated as high risk areas. More advanced systems, such as the patient fall prediction system described above of Johnson, attempt to distinguish motion that is specific to a patient fall from other motion detected in the patient room prior to issuing a patient fall alert. FIG. 4 is a flowchart of a method for implementing a patient fall detection system as is known in the prior art. Essentially, prior art fall detection methodologies focus on specific spatial areas in, for example, a patient room, to determine whether or not a patient fall has occurred. If changes in the monitored video occur within one of the designated errors, most prior art systems issue an alert. More sophisticated fall prediction systems attempt to concatenate patterns of video changes detected in different room positions that infer patient movement of the type that usually precedes a fall. In any case, a setup procedure is invoked at, for instance, the nurse monitor device where a healthcare professional identifies the location of the patient within the viewport (step 402). Once the patient's location is known, a plurality of areas with an elevated risk of patient falls are identified within the viewport (step 404). These areas include any portion of the room that might present a hazard for the patient, including, the floor, or an area proximate to a lavatory, sink, chair or bed or anywhere that the patient might experience a fall. Next, the prior system monitors the predefined risk areas for changes between video frames (step 406). Motion within an area is inferred from changes in successive video frames proximate to a risk area. Next, more advanced patient fall detection systems attempt to distinguish specific motion from general motion (step 408). For example, the mere detection of a change occurring between video frames within a risk area is not, in itself, indicative of motion; and the mere interpretation of motion within a risk area is not, in itself, indicative of patient movement. One mechanism for distinguishing specific motion from general motion is by tracking the movement patterns detected in different detection areas within the patient room and comparing the movement patterns to a library of signature, each of which identify a specific type of patient movement. Motion that forms a pattern with previous motion (motion detected between previous frames) that does not match a signature is discarded. Additionally, motion that forms a patter with previous motion that matches non-patient motion is discarded (such as another person entering the patient's room). Motion that forms a pattern with previous motion that matches a non-fall patient signature is discarded (such as the patient rolling over in bed or making some other risk-free movement). Only when motion that forms a pattern with previous motion and that pattern matches a patient fall signature is an alert issued (that is a pattern of patient movements that is indicative of a high risk movement) (step 410). As may be appreciated from the foregoing, the prior art suffers from at least three major shortcomings: the reliance on video changes occurring within a designated risk area for issuing a patient fall alert; the number of movement patterns that must be tracked, updated and compared to a library of motion signatures at each frame for identifying specific motion related to a patient fall; and the frequency of false alarms created by noise that is unrelated to movement of the patient or patient falls.

With further regard to the volume of unwarranted and false alerts issued that must be investigated by the health care professionals in the prior art fall detection systems, these unwarranted and false alerts fall into one of three separate categories. An alert triggered by non-risky motion or movement (rather than by a patient movement that is a precursor to a patient fall), an alert triggered by the patient or someone else present in the room, or an alert being triggered by misinterpreting video changes as movement, usually from noise. In an effort to reduce the sheer volume of unwarranted and false alerts, the automated functions of many prior art fall monitoring systems merely issue alerts under conditions where it is likely that the patient has already fallen, thus eliminating an opportunity for the healthcare professional to prevent a patient fall.

In an effort to overcome the shortcoming of the prior art, a noise correcting patient fall risk state prediction invention is presented below. Before discussing the methods implemented by the present noise correcting patient fall risk state prediction invention (depicted in FIGS. 7, 8 and 10-13D), some brief descriptions of the invention, nomenclatures use herein and state transition examples might be useful. Briefly, the present noise correcting patient fall risk state prediction system correlates patient events to a fall risk state. More particularly, the present noise correcting patient fall risk state prediction invention correlates any change in patient movement to a fall risk state, or more particularly, to entry into a patient fall risk state.

This correlation is not made in a vacuum, but instead the system assesses changes detected between video frames based on the present fall risk state of a patient. Essentially, the present noise correcting patient fall risk state prediction system evaluates the fall risk state of the patient in order to identify patient movements that may be indicative of a patient fall, rather than merely attempting to detect movement in a particular area of the patient's room. Patient fall risk states are defined hereinafter as a set of patient risk states, of differing importance with respect to a fall, that define the patient's potential for a fall based on a specific type of patient movement at the current risk state. The precise nomenclature and number of patient fall risk states is not important for describing or practicing the present invention, i.e., patient fall risk states between 1 and n, or alternatively patient fall risk states identified with system state identifiers, REST, WAIT, NO WAIT, LISTEN and TRIGGER. The primary aim here is to correlate a detected change in patient movement (referred to below as a patient event) to a fall risk state (or more correctly, a fall risk state transition to a particular fall risk state). The new fall risk state or state transition to the new fall risk state is based on the type of event that the change of patient movement represents, the current fall risk state, the part of the patient body for which the event was detected and a set of fall risk state transition rules associated with the part of the patient body (in other words, area specific, fall risk state transition rules).

For the purposes of describing the present noise correcting patient fall risk state prediction invention, an event is an occurrence that if detected may require the present noise correcting patient fall risk state prediction system to enter into a new patient fall risk state. In general, an event represents a change in the motion detected for a monitored area of video frame (usually the patient body part or some other area of the patient's room). More particularly, an event is measured as a change in a valve of a parameter of a video frame or, perhaps, between video frames. For the purposes of describing exemplary noise correcting patient fall risk state invention, two types of events will be primarily discussed, ACTIVE and INACTIVE events.

An ACTIVE event is detected when a parameter value or the change in a parameter value exceeds a threshold amount. For example, when a change in a parameter value is detected between video frames, the change in that value may represent the occurrence of an event. More particularly, if a change (or difference) in the total pixel weights between a current video frame and a background frame is detected that exceeds a predetermined motion threshold amount, an event has occurred, more specifically, a motion related event. The threshold level is predetermined based on at least the type of parameter being monitored and the size of the area being sampled. Because the exemplary event represents some type of change, hence activity within the video frame, this type of event is described as an ACTIVE type event.

Alternatively, if total difference does not exceed the motion threshold amount, then it might be understood that no event has occurred. However, because the present noise correcting patient fall risk state system may enter into higher (elevated) fall risk state from the current fall risk state based on activity, it may also enter a lower fall risk state based on inactivity. For the opposite condition, when no change is detected between a pair of video frames, that area is considered INACTIVE or no motion. In other words, an INACTIVE event is said to occur in the absence of the occurrence of an ACTIVE.

While monitoring change between full video frames is of some importance, for instance, for determining which video frames to tag for archiving, detecting motion somewhere in a video frame is of only marginal value in assessing a patient fall risk state for predicting patient falls. What is needed is to detect events occurring within a predetermined area of the video frame that is proximate to a portion of the patient body (or body part), wherein motion of that part of the patient's body may be a precursor to a fall. Therefore, the video frame is typically subdivided into predetermined areas, one or more of which are proximate to or surrounding a patient body part or area. Each predetermined area is evaluated separately for detecting events, which are then used by the fall risk state process for determining which new fall risk state to enter (if any). However, as will be discussed below, depending on the current fall risk state and other conditions, it may be permissible to circumvent any predetermined areas that are not relevant to the current fall risk state of the system. In other words, the noise correcting patient fall risk state system may not evaluate any predetermined areas in which the occurrence of an event could not cause the system to enter another fall risk state.

The noise correcting patient fall risk state system does not enter a new patient fall risk state merely upon the detection of a patient event, instead, the system calls up a set of fall risk state transition rules that govern the state transitions. Exemplary state transition rules are depicted in the diagrams on FIGS. 14A-B, 15A-B and 16A-E. Several facts concerning state transition should be understood before continuing the discussion on patient fall risk states. First, the exemplary noise correcting patient fall risk state system will not enter an elevated patient fall risk state unless an ACTIVE type event is detected. Moreover, depending on the specific fall risk state transition rules, the event should occur in a particular predetermined area of the video frame for the system to enter to an elevated fall risk state, if at all. Second, the exemplary noise correcting patient fall risk state system will enter a lower patient fall risk state if one of two conditions is present: an INACTIVE type event is detected or the time period associated with the current patient fall risk state expires. Hence, fall risk state transition rules not only govern state transitions, but also provide the system with transition information concerning fall risk states, such as time periods for maintaining a state. Finally and as alluded to directly above, the fall risk state transition rules are specific to the particular predetermined areas within the video frame. That is, an event occurring in one predetermined area of the video frame will cause the system to respond differently from the same event being detected in a different predetermined area.

The fall risk state transition rules govern state transitions, and hence dictate which patient movement put the patient at risk of falling and which movements should be excluded as a risky movement. Therefore, some of these transition fall risk state transition rules prohibit the system entering into the next logical fall risk state that the detection of a particular type of event that would otherwise dictate. For instance, if another person is detected in the patient's room and very close to the patient, that person is likely a healthcare professional attending the patient. For that scenario, issuing an alert for a patient fall would be erroneous since any movement by the patient is likely in response to that of the healthcare professional. Therefore, for that scenario, the fall risk state transition rules may define a specific elevated fall risk state, that precludes the system entering a critical fall risk state regardless of the type of event that is next detected or its location. This is an exemplary state transition rule defining the exemplary WAIT state, discussed immediately below and throughout the present disclosure (see also the diagrams depicted in FIGS. 14A-8, 15A-B and 16A-E). In so doing, the system is not sensitive to mere changes between video frames detected within a certain area of the viewport. Rather than merely monitoring areas of a patient room, as in the prior art, the present noise correcting patient fall risk state prediction system monitors areas that correlate and/or are proximate to specific parts of a patient's body for particular types of events and then applies fall risk state transition rule for the type of event detected at a particular part of a patient's body and the current fall risk state.

Below is a table listing exemplary scenarios for newly detected ACTIVE events (more complete sets of exemplary state transition are depicted in the diagrams in FIGS. 14A-B, 15A-B and 16A-E). It should be mentioned that the scenarios below are not the only possible scenarios and do not represent all possible patient scenarios and/or all event types disclosed hereinafter. For simplicity, fall risk state transitions due to the detection of INACTIVE events have not been listed in the table, nor have fall risk state transitions due to the expiration of time periods.

TABLE I

| Detection | Interpretation of event | New Action |
|---|---|---|
| No Change | No motion in the patient's room | None, continue in lowest fall risk state, e.g., REST |
| Raw changes anywhere in the room | If initial change between frames, treat as noise | None, continue in current fall risk state |
| Noise filtered changes anywhere in the room | Motion | Archive frame, evaluate event to determine proper fall risk state |
| Noise filtered changes corresponding to an area outside the patient's body area | Motion, probably another person in patient's room | Archive frame, without elevating the current fall risk state |
| Noise filtered changes corresponding to an area outside but very close to the patient's body area | Motion, probably another person in patient's room attending to the patient | Archive frame, elevate fall risk state to a low intermediate risk state that precludes elevating to a high fall risk state without detecting additional patient movements for a predetermined time, e.g., WAIT, and set time period |
| Noise filtered changes corresponding to the patient's body area | Patient movement (General interpretation) | Archive frame, and, generally, update the fall risk state and set a time period associated with the updated fall risk state |
| Noise filtered changes corresponding to the patient's body area | Any patient movement with another person in room and very close to the patient's body (currently in the WAIT state) | Archive frame, and depending on where the event occurs, either lower the fall risk state, e.g., NO WAIT, and set a time period for a new WAIT fall risk state, or continue WAIT state for time period without elevating fall risk state until the expiration of the WAIT time period |
| Noise filtered changes corresponding to the patent's body area | Initial patient movement that is not a direct precursor to a fall without other motion detected in room (in REST state) | Archive frame, and elevate patient fall risk state to a low intermediate fall risk state, e.g., NO WAIT, and set the time period associated with the fall risk state |

TABLE I-continued

| Detection | Interpretation of event | New Action |
| --- | --- | --- |
| Noise filtered changes corresponding to the patient's body area | Additional patient movement that is a precursor to a fall without other motion detected in room (in NO WAIT state) | Archive frame, and supplement current low intermediate patient fall risk state with a high intermediate fall risk state, e.g., LISTEN, and continue the time period associated with the low intermediate patient fall risk state |
| Noise filtered changes corresponding to the patient's body area | Initial patient movement that is a direct precursor to a fall without other motion detected in room (in REST state) | Archive frame, and elevate patient fall risk state to an intermediate fall risk state, e.g., LISTEN, and set the time period associated with the fall risk state |
| Noise filtered changes corresponding to the patient's body area | Continued precursor movement to a fall without other motion in room (in LISTEN state) | Archive frame, and continue patient fall risk state at a high intermediate fall risk state, e.g., LISTEN, and set the time period associated with the fall risk state |
| Noise filtered changes corresponding to the patient's body area | Additional precursor movement to a fall without other motion in room (in LISTEN state or NO WAIT + LISTEN states) | Archive frame, and elevate patient fall risk state to a high fall risk state, e.g., TRIGGER, issue a fall alert and set the time period associated with the fall risk state |
| Noise filtered changes corresponding to the patient's body area | Time expires for any time limit running | If in a single fall risk state, lower fall risk state to the next lower fall risk state, e.g., NO WAIT to REST, or WAIT to REST, or LISTEN to REST, or ALARM to REST; if simultaneously in two fall risk states, revert to the second fall risk state, usually NO WAIT + LISTEN to LISTEN |

Continuing with the discussion of event detection, the presently described noise correcting patient fall risk state system also monitors corresponding predetermined areas of a pair of video frames for a change in the type of event in order to determine if the system should enter a new fall risk state for the patient. In other words, the system does not just detect events, but also detects changes in the type of event being detected within a predetermined area of the video frame. Consequently, for example, a patient event that occurs as a change from no motion to motion (i.e., INACTIVE to ACTIVE) is of more importance to the system for accessing state transition, at least for entering an elevated fall risk state, than no change in motion (i.e., ACTIVE to ACTIVE). Here again, this distinction over the prior art enables the present noise correcting patient fall risk state prediction system to further discriminate mere changes between video frames from motion, and more importantly, to further distinguish the types of patient movement from mere motion detected within the patient's room. For example, a predetermined area containing an ACTIVE event will not generally cause the system to enter a new (or elevated) fall risk state by detecting ACTIVE events in subsequent video frames within the area. Generally, however, the system will not fall back into a lower fall risk state than the highest risk state corresponding to events occurring in any of the predetermined areas. Therefore, continued patient movements detected as ACTIVE type events within a predetermined area will generally cause the system to maintain the current fall risk state, even beyond the expiration of a predefined time period associated with the current patient fall risk state (the use of fall risk state time periods is discussed directly below).

In accordance with other exemplary embodiments of the present invention, the present noise correcting patient fall risk state prediction system utilizes a unique sets of fall risk state rules for the patient's position and/or orientation. Depending on the position and orientation of the patient, only certain types of events that correlate to particular patient body parts are understood as precursors to a patient fall, therefore, only certain types of events that correlate to particular patient body parts can cause the system to enter an elevated patient fall risk state. The fall risk state transition rules are adjusted to accommodate those differences. For instance, the present noise correcting patient fall risk state prediction system may have at its disposal unique sets of fall risk state transition rules for a patient seated in the lavatory, a patient seated in a chair in one or more orientations to the surveillance camera, a standing patient in one or more orientations to the surveillance camera, a recumbent patient in the bed, etc.

With further regard to the sets of fall risk state transition rules, optimally, a unique set of fall risk state transition rules is resolved and stored for each possible patient position and/or orientation. As mentioned above, these sets of fall risk state transition rules are area-specific, that is, unique transition rules are defined for events associated with different patient body parts. For simplicity in describing the present invention, at least fourteen distinct patient body parts are defined as represented in the diagram of a seated patient in FIGS. 9A and 9B. These comprise upper torso 910, and at least three sets of upper torso rails: upper left inner torso rail 912, upper right inner torso rail 922, upper left middle torso rail 914, upper right middle torso rail 924, upper left outer torso rail 916, upper right outer torso rail 926, and in addition lower torso 950, and at least three sets of lower torso rails: lower left inner torso rail 952, lower right inner torso rail 962, lower left middle torso rail 954, lower right middle torso rail 964, lower left outer torso rail 956, and lower right outer torso rail 966. For some patient positions and/or orientations, such as the seated position, the sets of torso rails may include an optional top rail located above the patient, upper top inner torso rail 932, upper top middle torso rail 934 and upper top outer torso rail 936. Upper and lower torso 910 and 950 areas are generally defined as rectangular pixel sets on the video frame that surround and include the upper and lower torsos, respectively, although the shape might instead be curvilinear. The extent to the respective torso areas is to fully include a space on the video frame that will regularly receive patient movement having a low fall risk. Hence, as depicted in FIG. 9B, upper torso 910 and lower torso 950 cover different shaped and sized pixel areas in the video frame. The torso rails are defined as parallel sets of pixels that adjoin at least one other torso rail and/or a torso area and, therefore, outside the space in the video frame that will receive low fall risk patient movement.

With further regard to the diagram of the seated patient in depicted in either FIG. 9A or FIG. 9B, the set of fall risk state transition rules for a patient's upper torso in a seated position is different from the set of fall risk state transition rules for a patient's upper torso in a recumbent position. This make logical sense since the movement of a patient's upper torso will always proceed a fall when a patient is seated in a chair, however, when the patient is laying in a bed, movement in the upper torso is far less definitive of a patient fall. It should be appreciated that the state transition rules may be entirely different for each position and/or orientation of the patient.

By way of example, suppose for a seated patient (such as depicted in either FIG. 9A or FIG. 9B, a new patient movement is detected in association with her upper torso, in other words, an ACTIVE event is detected in the upper torso area of the video frame. On one hand, detecting upper torso patient movement for a seated patient is a key forerunner movement for other patient movements that might be a precursor to a fall, but mere upper torso patient movement cannot in itself be indicative of a patient fall. Hence, detecting an upper torso ACTIVE event for a seated patient will not elevate the patient fall risk state to a high fall level, such as TRIGGER state where an alert is issued. However, detecting an upper torso ACTIVE event for a seated patient may elevate the fall risk state to an intermediate risk level, such as the LISTEN state (see the exemplary set of fall risk state transition rules for events received for a seated patient in FIG. 14B, see also 16A-E). As a sidebar, for the seated patient example above, clearly the patient will move her lower torso (including hips and legs) at some point prior to experiencing a fall, however the vast majority of lower torso movement is usual and routine, and simply not a reliable indication of a fall. Therefore, ACTIVE events detected in the lower torso area of a seated patient can never be interpreted as a forerunner or precursor movement to a patient fall (see again the exemplary set of fall risk state transition rules depicted in FIGS. 14B and 16A-E). Consequently, detecting a lower torso ACTIVE event cannot elevate a seated patient's fall risk state, even if the patient is currently in an intermediate or elevated fall risk state. Optimally, the sets of fall risk state transition rules are defined to reflect these scenarios.

In furtherance of the discussion of the previous example of upper torso patient movement and with regard to the exemplary set of fall risk state transition rules in FIG. 14B, no amount of upper torso patient movement will cause the fall risk state to enter a critical or TRIGGER fall risk state. That is, no type of event occurrence corresponding to upper torso 910 will cause the system to enter a critical (TRIGGER) fall risk state. Therefore, patient events should be detected in a different location for the system to enter a critical fall risk state. With the patient fall risk in an elevated fall risk state, one type of patient movement that may cause a state transition might be an event detected in an upper torso rail that bounds the patient's upper torso. Notice from the diagram that the fall risk state transition rules will prohibit the system entering directly into a critical fall risk state from events detected in an upper torso rail. However, with the system in an elevated fall risk state (LISTEN), then the state transition rules associated with the upper torso rail (for a seated patient) used by the present noise correcting patient fall risk state prediction system will further elevate the patient fall risk state, typically by entering a critical fall risk state such as the TRIGGER or highest numerical state.

FIG. 5 is a flowchart depicting a generic method of the present patient fall prediction system in accordance with an exemplary embodiment of the present invention. Typically, processor 106 will execute all or most methods above the pixel level processing within the video processing (which is typically performed by video processor 109, if available), including fall risk state processing and noise reduction processing (each discussed below). Essentially, the present noise correcting patient fall risk state prediction system comprises four separate, but related processes, the setup process, or setting up the state process and associated rules for the patient position and orientation (step 502), the video process, or processing the video frames (step 504), the noise reduction process, which may be considered as a sub-process of the video process, for discriminating noise that might generate an invalid event (step 506) and invoking the state process for assessing the state of fall detection and updating the system state based on elapsed time, event detection and state rules for the event (step 508). These separate processes will be understood more completely through a more detailed discussion of the separate processes associated with the fall risk state system.

Essentially, the present noise correcting patient fall risk state system and method for predicting patient falls utilizes three integral processes for assessing the fall risk state of a patient, video, noise reduction and fall risk state. However, fall risk state processing is dependent on several factors, including the positions of parts of the patient's body and the associated fall risk state transition rules necessary for accelerating and decelerating a patient's fall risk state. These rules are, as mentioned above, dependent on the position and/or orientation of the patient which is determined in the setup phase (step 502). With the patient position and a set of fall risk state transition rules defined, video processor 109 receives video frames and processes them for changes between frames (step 504). Video processing may utilize any one of several video procedures, however, it has been found to be advantageous for video processor 109 to determine differential values (weights) for various pixel locations (as well as predetermined area of pixels) between the current frame and the cached weights at corresponding pixel locations for a background video frame (for the purposes herein, a background frame is one of the previous frames, not necessarily the most recent previous video frame). The pixels weights and differential weights for the current video frame are then cached in the same manner as the background frame, as the current video frame will become a background frame with the capture of a new current video frame. Other computations are also possible, such as summing the total weights and/or the total differential weights for all or predetermined areas of the pixel locations within a frame (such as predetermined areas of pixels that bind a patient body part). These are needed for determining a type of event associated with a predetermined area of the video frame, e.g. whether the type of event is an ACTIVE or INACTIVE). Typically, at any one time, the video cache may contain weights for each pixel location in the frame, the difference weights for each pixel location in the frame and a plurality of total weights and/or totals of difference weights for bound patient body parts corresponding to one, two or more background (previous) video frames.

Optimally, video processor 109 processes a video frame only once and then caches that resultant information for one of the resident processes within the noise correcting patient fall risk state prediction system, such as the noise reduction process, the fall risk state process, etc., that subsequently uses the information. Typically, the system caches pixels weights, with the location information, for each of the pixels in the video frame. Those separate processes will then correlate pixel locations to predetermined areas within the video frame as defined by the respective process. Processing the video frame as a unit prior to subsequent noise and fall risk state processing as two distinct advantages over first subdividing the frame into the patient areas and processing each separately. First, the noise correcting patient fall risk state prediction system utilizes the video information for determining whether or not to archive the current video frame without any subsequent processing. Changes in the pixel weights or the total weights between a background and current video frame indicate motion somewhere in the patient's room. Then, the video system activates a patient video archive for saving the current video frame to a safe location for possible future use and review. Another advantage is that it reduces video processing complexity since events are usually defined as an amount of change between corresponding predetermined areas within video frames that exceeds a threshold. Thus, it is necessary only to compare total weights for detecting an event within a predetermined area of the video frame (as well as identifying the type of event). One exemplary video processing method is discussed in greater detail below with regard to FIGS. 13A-13D.

Once the video process has been completed in the current frame, a noise reduction process is invoked to cull frames with detected events that are likely noise related (step 506). Although the use of the present fall risk state paradigm greatly reduces the frequency of false alarms over that of the prior art, the frequency of alarms resulting from spurious noise can be even further reduced by implementing a noise reduction process directed at identifying events that have a high probability of being generated by noise. These events, in general, are characterized as being one-time, non-repeating changes between video frames (or more specifically, between corresponding areas on a video frame) and, therefore, cannot be correctly attributed to patient movements (a typical patient movement continues over a plurality of video frames). One relatively effective noise reduction technique for discriminating events resulting from spurious noise is by only evaluating sequential frames in which corresponding like-typed events have been detected. Spurious noise, unlike patient movements, is random and short-lived, typically occurring in only one frame. For example, if an area of a background frame is INACTIVE (the last event detected in the area was an INACTIVE type of event) and an ACTIVE event is detected in the area for the current video frame, the source of that ACTIVE event is recognized to be possible noise. The event is not accepted by the system and the area is re-interrogated in the subsequent video frame for a subsequently occurring ACTIVE event. If it occurs, then that ACTIVE event is attributed to motion and made available for fall risk state processing. Therefore, if the frames are tested for events having a duration that lasts longer than a single frame, most spurious noise can be eliminated as the event source. As a practical matter, electronic noise, improper grounding, or power fluctuations result in very short-lived events that generally will not repeat between pairs of video frames, hence skipping a suspect frame (or suspect areas within a frame) will typically eliminate any noise-based events detected between frames. Longer duration noise or noise that sweeps across the video over n successive video frames can be discriminated by comparing n+1 sequential frames. Skipping more that a single frame may also be necessary for eliminating noise from high speed video, perhaps over 24 fps (frames per second).

Once the noise has been eliminated as a source for the events detected for the separate patient body parts, the fall risk state process is invoked (step 508). The intent of fall risk state process is to determine the state of fall risk for the patient based on the current fall risk state, events detected in the current video frame and sets of area-specific fall risk state transition rules. Once the current fall risk state has been evaluated, the process generally reverts to step 504 for receiving the next video frame and proceeds from that step as discussed above. However, in certain circumstances the patient's position within the patient room changes, such as the patient being moved from the lavatory to a chair, the process then reverts to the setup step 502 and proceeds.

With further regard to fall risk state processing, essentially the process should be performed for each frame providing an event occurs somewhere within the frame. Recall that the present noise correcting patient fall risk state prediction system will enter a new state under only two conditions, the detection of an event (ACTIVE or INACTIVE) or the expiration of a predetermined time period for the current fall risk state. By testing the elapsed time in the current fall risk state against the predetermined time period for that state at each video frame, the state processing can be omitted if the current video frame is free of events, the process merely reverts to the video process for the next frame. Briefly, however, the fall risk state process performs three sub-tasks: 1) the process determines the current fall risk state; 2) then, the process assesses the elapsed time in the current fall risk state and compares the elapsed time to a time period for the current fall risk state, if the time period has been exceeded, the current fall risk state is updated, typically by lowering the fall risk state to the next lower fall risk state to the current fall risk state, but might instead be lowered to the lowest fall risk state or REST state; and 3) finally, the fall risk state process interrogates each bound patient body part within the video frame for an associated event, and then updates the current fall risk state according to the fall risk state transition rules associated with the body part that moved (ACTIVE) or stopped moving (INACTIVE), thereby causing the event. The implementation of the fall risk state process may produce several seemingly conflicting fall risk states, however, in general, with one exception that will be discussed below, the highest fall risk state is selected as the current patient fall risk state. The implementation of these sub-tasks will become more apparent through a discussion of a frame-based fall risk state processing depicted in FIG. 6. An even more comprehensive description of the present fall risk state process is depicted in flowchart of FIG. 12 in accordance with other aspects of exemplary embodiments of the present noise correcting patient fall risk state prediction invention.

Figure 6:
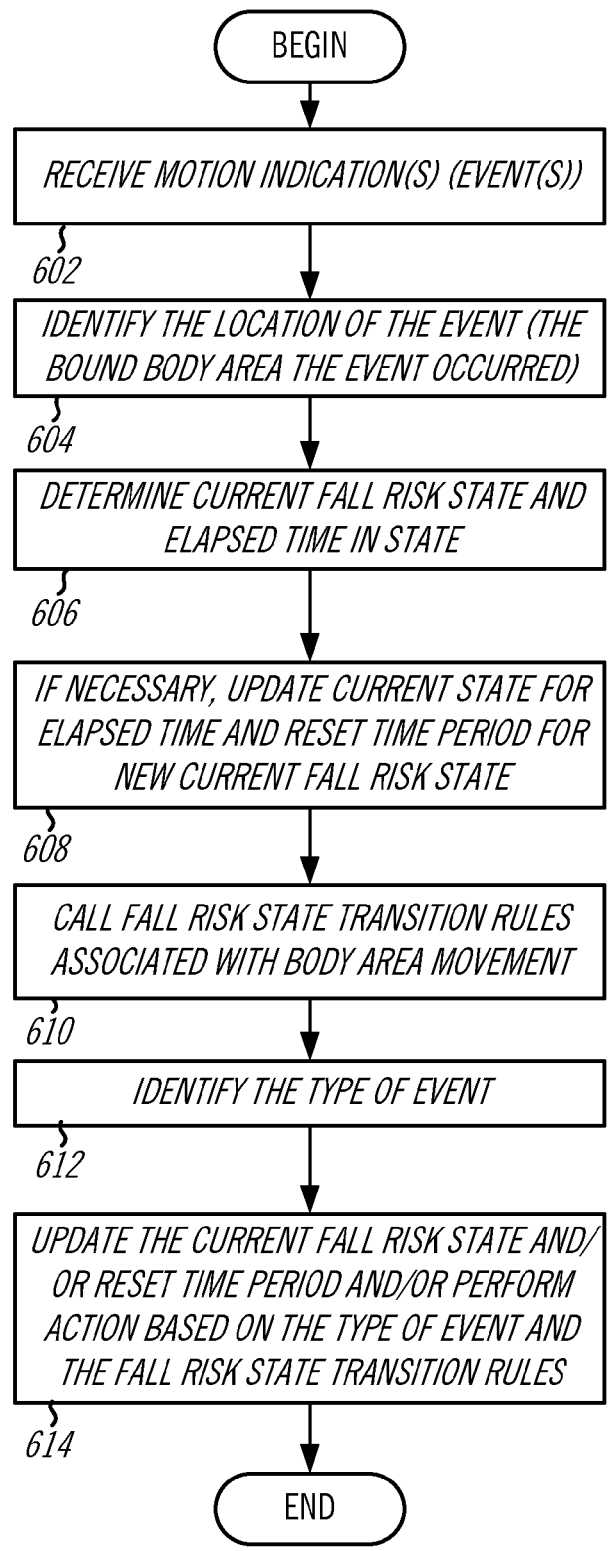
FIG. 6 is a flowchart depicting a generic method for processing state information for predicting a patient fall in accordance with an exemplary embodiment of the present invention.

FIG. 6 is a flowchart of a more detailed method for processing fall risk state information for predicting a patient fall in accordance with various embodiments of the present invention. The process begins with the receipt of one or more motion indications from the video processor (step 602). These events may be either ACTIVE or INACTIVE types of events. Recall that for each bound area of a patient body part on the video frame, the system may retain only a total and total difference pixel weights for predefined areas in the background and current video frames. A comparison of these weights signify events associated with particular patient body parts that are used in the determination of the patient fall risk state. Detection of these events is generally needed for the fall risk state process, so if no changes are detected by the video process, no events can be detected for the current frame. In that case, the fall risk state process may be omitted for the current frame altogether because a time-in-state test for the current state may be performed prior to applying the fall risk state transition rules for an event occurring in a future video frame. However, assuming an event has been detected, or the state processing will proceed only for testing the time-in-state, the fall risk state process identifies the part of the patient's body that moved from the bound area within the video frame that the event occurred (step 604).

Often, the video process will detect events associated with multiple patient body parts. One advantage of the present noise correcting patient fall risk state prediction system is how the system interprets these seemingly conflicting events without issuing unnecessary and unwarranted patient fall alerts to the HCPs. First, the fall risk state process determines the correct current patient fall risk state for the time that has elapsed for the current patient fall risk state (step 606). Next, the elapsed time in the current state is compared to a predetermined time period for the state. If the elapsed time exceeds the time period, the system enters a new, usually lower fall risk state, i.e., the risk of a patient fall is downgraded to a lower fall risk state and the time period set for the new current risk state (step 608).

With the correct current fall risk state and time period, the fall risk state process next evaluates the events with respect to the separate patient body part(s) associated with the event(s). A current fall risk state cannot be elevated to a higher fall risk state without patient movement detected in specific patient body parts. Specific of fall risk state transition rules apply to each patient body part, so the system acquires the transition rules associated with the body parts associated with the detected events (step 610). All other patient body parts within the video frame are excluded from evaluation by the fall risk state process, thereby greatly reducing the processing complexity.

At this point, the fall risk state process has identified changes between video frames and associated the changes with specific patient body parts that constitute events (step 612). The fall risk state process finally updates the current fall risk state based on fall risk state transition rules and resets the time period accordingly (step 614). Essentially, the present noise correcting patient fall risk state prediction system places the patient in the highest fall risk state according to any of the fall risk state transition rules associated with any body part in which an event has occurred. It is possible, or probable, that events will occur in multiple patient body parts and these events will result in multiple conflicting patient fall risk states. However, the fall risk state process culls all potential lower patient fall risk states to the exclusion of the highest detected patient fall risk state.

For example, for a seated patient the current patient fall risk state is an intermediate patient fall risk state, for instance a LISTEN state, and events for the current video frame are detected for both the patient's upper torso and the patient's upper torso inner rail. For example, with reference to the fall risk state transition rules of FIG. 14B, for a seated patient in the LISTEN fall risk state, receiving ACTIVE events for both the upper torso and an inner torso rail will result in the system entering the TRIGGER state and an alert being issued, for the following reasons. Any events detected for the upper torso in the LISTEN state require the system to enter (reenter) the LISTEN fall risk state (the LISTEN state for the upper torso has no time period so the system effectively reenters the LISTEN state by detecting each ACTIVE event). Hence the system is apparently in a LISTEN fall risk state. However, events detected for an inner torso rail in the LISTEN state require the system to enter the TRIGGER fall risk state. From the precedence of states in the second column, the system cannot enter the LISTEN and TRIGGER state simultaneously, so the higher state is selected. Notice, however, that the fall risk state transition rules allow for the system to enter both the LISTEN and NO WAIT states simultaneously.

Therefore, for the above example, if the system is in a NO WAIT state and detects an event at the upper torso (either ACTIVE or INACTIVE), the system will enter the LISTEN+ NO WAIT states, for at least the duration of the time period for the NO WAIT state.

FIGS. 7, 8 and 10-13D below correlate to particular steps in the generic fall risk state process illustrated in FIG. 5. FIGS. 7, 8 and 10 further describe the setup process of step 502, FIG. 11 further describes the noise reduction process of step 506, FIG. 12 further describes the fall risk state process shown in step 508 and portions of FIGS. 13A-13D further describe the video process shown in step 504. FIGS. 7 and 8 illustrate manual and automated setup phases, respectively, in accordance with exemplary embodiments of the present noise correcting patient fall risk state prediction invention. The manual setup phase depicted in FIG. 7 is similar to that disclosed in FIG. 5 of U.S. application Ser. No. 12/151,452, with the exception of binding patient body features to the video screen rather than merely to areas of the patient's room. The process begins by manually identifying the patient and the patient's body features within the viewport (the video frame) (step 702). Next, the operator defines the patient's body features within the viewport (step 704). Because the present noise correcting patient fall risk state prediction system operates with the patient in a variety of positions and orientations, two pieces of information may be necessary from the operator, a display screen area and a body part identification for each display screen area. Additionally, because the noise correcting patient fall risk state prediction system will call up unique sets of fall risk state transition rules for each patient position and/or orientation, the patient's position and orientation may also be provided. For example, the user defines patient body parts on the display screen by drawing bounding boxes around the patient body parts on touch screen 114 and then enters the body part type using mouse 116 or keyboard, e.g., upper torso, lower torso, (upper, lower) (right, left) (inner, middle, outer) torso rail, etc., along with the patient's position, e.g., seated, standing, recumbent, etc. The present noise correcting patient fall risk state prediction system, e.g., nurse monitor device 110, then translates the display screen coordinates into the video frame space (step 706) and binds the patient body part areas drawn by the user to the patient and to the video frame space (step 708). Finally, the present noise correcting patient fall risk state prediction system calls up a set of fall risk state transition rules corresponding to the patient's position and orientation (step 710).

The automated setup phase is similar to the manual setup, with the exception of the noise correcting patient fall risk state prediction system analyzing a sample video frame for identifying patient body parts and locations. The process begins with the system analyzing the sample video frame for the patient (step 802) and then recognizes the patient, the patient's position and orientation within the video frame (step 804). Clearly, the system may query the user for verification. Next, the system binds the patient body part areas defined by the system to the patient (step 806). It is expected that the system will work in video space so the system need not translate features to and from display space. With the patient and the patient's position and orientation known, the present noise correcting patient fall risk state prediction system calls up a set of fall risk state transition rules corresponding to the patient's position and orientation (step 808).

Binding patient body features is a relatively uncomplicated sub-process, but its importance to various exemplary embodiments of the present invention should not be overlooked. The aim of binding is to correlate an area of the video frame to a range of movement associated with a patient body part. The movement of a patient body part within that range has some significance to a patient's risk of falling. That is, to correlate a patient body part movement area on the video frame to a range of patient fall risk states (at least one fall risk state and not the entire gambit of risk states). For example, defining a patient head area would be of little use unless certain head movements could be identified that are precursors to a patient fall. The primary exemplary body parts that have some movement significance to a patient fall are the upper torso, the lower torso and a plurality of upper and lower torso movement rails that run adjacent to portions of the upper and lower torsos. The extent of the binding area should define a fall risk range of movement, i.e., the upper torso should not be defined so large as to encompass patient movements that run the entire spectrum of elevated fall risks, e.g., NO WAIT through TRIGGER.

Returning to the flowchart on FIG. 10, the binding process begins by identifying patient body features (step 1002). Next, areas of the video frame are identified as corresponding to the respective patient body features (step 1004). The shapes, orientations, and positions of the areas are predetermined based on, for instance, the respective body features with respect to the patient's position and orientation within the video frame. In addition, state transition rules associated with each predetermined patient area also correlate to the patient's position and orientation. Because each body feature has a potentially different range of patient body part movement that are of some significance to a patient's risk, the extent of the binding areas may differ depending on the patient's orientation in the viewport (video frame). Compare, for instance, upper torso 910 with lower torso 950 in FIG. 9A with that in FIG. 9B, but also the extent of upper torso 910 in the different patient orientation as shown in FIG. 9A and FIG. 9B. Finally, the system binds the patient body part movement areas on the video frame, defined by the system, to the respective patient body parts that may move within or into those areas (step 1006). With the fall risk state process set up and the predetermined areas bound, the noise correcting patient fall risk state prediction system could directly invoke fall risk state process, however, any system noise that may be present could result in the system improperly entering a higher fall risk state or possibly issuing a false alarm fall alert.

System noise, especially of an electronic and electrical nature, greatly increase the volume of false alarms issued by present noise correcting patient fall risk state prediction system because many false alarms are treated as patient events that cause the system to enter a critical fall risk state (TRIGGER state). However, in general changes in video frames from electrical and electronic noise originating from noisy electrical/electronic components, improper grounding, or power fluctuations can be distinguished from motion captured by the video camera 102 by its duration. Generally, electrical and electronic noise result in very short-lived events that generally will not repeat between pairs of video frames, hence skipping a suspect frame (or suspect areas within a frame) will typically eliminate any noise-based events detected between frames.

FIG. 11 is a flowchart depicting a noise reduction method for processing video frame information in a noise correcting patient fall risk state prediction system in accordance with an exemplary embodiment of the present invention. The purpose of the noise reduction process is to discriminate possible noise from motion, but without interfering with subsequent fall risk state processing. In other words, if no change in the total weight, beyond a threshold amount, is detected for an area between two previous background frames, then no motion has been detected in that area of the previous background frame, it is INACTIVE. However, if a change is detected in the total weight, above the threshold amount, for the corresponding area between the current video frame and the previous background frame, then motion has been detected in that area of the current video frame, which is now ACTIVE. Furthermore, the motion in the area apparently started at the current frame because it changed to ACTIVE from INACTIVE. Since very short duration motion cannot be accurately relied on for assessing the fall risk state of the system and may be a result of noise, the first video frame wherein new activity is detected in an area should be carefully scrutinized for noise (or perhaps the first several video frames which new motion is detected). The noise reduction process essentially culls any video frame from fall risk state processing that cannot be confirmed to be noise-free.

The process begins subsequent to the video processing by video processor 109 with processor 106 in patient monitoring device 101 receiving information for a new video frame, referred to as the current video frame (step 1102). As discussed above, typically the noise reduction process, as well as the fall risk state process, usually do not receive and process the video frames themselves, but instead only receive the pixel weight, total weight and total difference weight information from the video processor or memory cache for the current video frame and/or usually for a background video frame.

Next, the predetermined areas of the current video frame are examined for event activity, that is, to detect ACTIVE events (step 1104). Essentially, the noise correcting patient fall risk state prediction system classifies each predetermined area as being ACTIVE (containing temporal changes above a predetermined threshold amount) or INACTIVE (containing no temporal changes above the predetermined threshold amount) based on whether the total weight of the predetermined areas in a current video frame differs from the total weight of the corresponding predetermined areas in a background video frame. Changes, or differences in the weights are determined on a pixel by pixel correspondence for every pixel that contributes to an area. The total difference for an area is summed and the total difference should exceed a motion threshold amount for the respective predetermined area to be considered ACTIVE, or more correctly that an ACTIVE event occurred within the area. ACTIVE events may indicate motion in the area, but only if noise can be ruled out as a source for the event. Similarly, a change from INACTIVE to ACTIVE, for a corresponding predetermined area, between the current and a previous background video frame is also an indication of motion in that area of the current video frame, however in that case noise cannot be ruled out as the source of the event. Therefore, in accordance with one exemplary embodiment of the present invention, the noise reduction process invokes the fall risk state process only when all ACTIVE events in the current video frame correspond to an ACTIVE event in the background video frame.

If no ACTIVE events are detected, noise cannot be present in the current video frame, so it can be accepted as a background video frame (step 1110) and then fall risk state processed. As will be discussed below, while the detection ACTIVE events are paramount in elevating a fall risk state, INACTIVE events play an important role for entering into lower risk states. Therefore, even though the current video frame may not have any ACTIVE events, the frame will be fall risk state processed. Again, notwithstanding the video archival process, the information from the video processor corresponding to the current video frame is saved for further processing and usually not the current video frame itself.

If, at step 1104, one or more of the predetermined areas within the current images frame are ACTIVE, the process continues at step 1106, for comparing ACTIVE areas in the current video frame with the corresponding predetermined areas in the background video frame. Here, the aim is to discover if all of the ACTIVE events detected in the current video frame transcend multiple video frames, that is, determine if the duration of the activity exceeds the maximum duration of noise, i.e., one video frame. Therefore, if any of the ACTIVE areas in the current video frame was not active in the background frame, then noise cannot be ruled out as a source of the events in the current video. The current video frame, therefore, cannot be fall risk state processed, but may be saved as a background frame for future comparisons with new video frames (step 1108).

If one or more predetermined areas of the current video frame are ACTIVE, and those ACTIVE areas were also ACTIVE in the background frame, then the source of the activity cannot be noise because the duration of the ACTIVE event(s) transcends multiple image frames (at least two). Therefore, since the events detected in the current video cannot be from noise, the information relating to the current video frame is cached as a background frame (step 1110) and the fall risk state process is invoked for the current video frame (step 1112).

It should be appreciated that the noise reduction process treats all newly detected ACTIVE events in any corresponding area between consecutive video frames as being generated by noise and culls information from that frame from subsequent the fall risk state processing. In other words, if a new INACTIVE event is detected in any predetermined area, fall risk state processing continues as normal for that particular video frame, or if an ACTIVE event is detected in a predetermine area in which an ACTIVE event was detected in the previous video frame, fall risk state processing also continues as normal. However, the video frame that a new ACTIVE event is detected, that is an ACTIVE event that does not correlate to an ACTIVE corresponding area in the previous video frame, that ACTIVE event cannot be used by the system for determining the patient's fall risk state.

Once a current video frame has been examined and passed by the noise reduction process for spurious noise, the fall risk state process is invoked. FIG. 12 is a flowchart depicting a method for processing patient fall risk states from changes detected between video frames in accordance with one exemplary embodiment of the present invention. Here, the present description is slightly more comprehensive than those discussed with regard to FIGS. 5 and 6 including, for instance, a description of the time-in-state testing that typically proceeds the fall risk state evaluation. Essentially, the fall risk state process of the present noise correcting patient fall risk state prediction system utilizes four pieces of information for determining the current fall risk state for a patient: 1) the current fall risk state; 2) a set of fall risk state transition rules associated with the part of the patient body part being evaluated (the predetermined area of the video frame); 3) the elapsed time in the present fall risk state; and 4) current event information. The interactions and relationships between these four types of information can be visualized diagrammatically, for instance, in the truth tables depicted in FIGS. 14A and 14B for a patient in a recumbent position and one in a sitting position, respectively, or in the generic sample state process illustrated on the tables depicted on FIGS. 15A and 15B for two distinct patient positions, and also as a set of fall risk state transition rules for various patient position as depicted in FIGS. 16A, 16B, 16C, 16D and 16E for a set of fall risk states consisting of REST, WAIT, NO WAIT, LISTEN/ NO WAIT, LISTEN and TRIGGER each in two distinct, but generic patient positions.

The fall risk state process begins by receiving the next current video frame, or more correctly the information from video processor 109 associated with the current video frame (step 1202). The current fall risk state of the system is determined (usually from the last iteration of the fall risk state process) (step 1204) and the time in state (TIS) for the current fall risk state is checked against the time period for the current fall risk state (step 1206). If the time period for the current fall risk state has expired, the fall risk state process invokes the fall risk state transition (FRST) rules (step 1208) to determine the correct fall risk state for the system, usually the next lower fall risk state (step 1210). The fall risk state process proceeds by identifying and evaluating each of the predetermined areas in the current video frame (steps 1216 through 1232).

If however, the time in state has not expired, the fall risk state process then identifies the predetermined area in the current video frame to be evaluated (step 1216). Once an area is identified, the fall risk state process determines if the identified area is relevant to the current fall risk state (step 1218). Merely because a patient event is detected in some predetermined area, it does not necessarily follow that the present noise correcting patient fall risk state prediction system will enter into a new fall risk state. Some patient movements are simply not relevant for predicting a patient fall and therefore some events are not relevant to the current fall risk state. Some of these events occur in predetermined areas that cannot cause a state transition. For example, using the truth table in FIG. 14A, assuming the present noise correcting patient fall risk state prediction system is in the LISTEN risk state, any events that are detected in the upper torso predetermined area cannot cause the system to change states, therefore, for an example using the truth table of FIG. 14A, the upper torso predetermined area need not be evaluated by the fall risk state process in the LISTEN state. In that case, the system determined if that was the last predetermined area in the video frame to be evaluated, if so the system determined a new current fall risk state from the areas that were evaluated (step 1232). This step is merely optimizes fall risk state processing by evaluating only relevant areas, and may be skipped if desired by evaluating all areas regardless of their relevance to the current state.

Assuming at step 1218, the predetermined area is relevant to the current fall risk state, than an event detected in that area might cause the system to enter a new fall risk state. In that case, the system evaluates the information from the video processor for an event in the area (step 1220). If no event is detected, the method again reverts to step 1222 for another predetermined area as discussed above. If, however, at step 1220 an event is detected in the present predetermined area, that event may cause the system to enter a new fall risk state, either a higher or lower risk state. The event is identified (step 1224), for the current exemplary process the event may be an ACTIVE event or an INACTIVE event. With the event type known, the fall risk state transition rules are invoked (step 1226) and the system determines a new fall risk state and time period for the new state based on the type of event detected in the predetermined body area for the current fall risk state based on the fall risk state transition rules (step 1228). That state is then held in a cache (step 1230) until all of the predetermined areas of the video frame are evaluated by the fall risk state process. The process then iterates through steps 1222, 1216, 1218, 1220, 1224, 1226 and 1228 until every predetermined area in the video frame has been evaluated.

Here it should be appreciated that, while not probable, it is possible for events to occur simultaneous in several predetermined areas of the current video frame. Ordinarily, this is a conflict that should be resolved, but since the purpose of the present noise correcting patient fall risk state prediction system is to determine the highest fall risk state for the patient, and then issue a fall alert whenever appropriate, the system will eventually resolve all fall risk states in the cache in favor of the highest patient risk state (see again step 1232). The fall risk state process then continues with information from the next noise-free video frame.

The present noise correcting patient fall risk state prediction system has been described above at a relatively high level that will enable one of ordinary skill in the art to make and use the present invention and allow for a wide variety of changes and modifications without departing from the scope and spirit of the present invention. FIGS. 13A-13D depict a flowchart of a relatively low level implementation of one aspect of the present invention. This embodiment is not meant to limit the practice of the present invention of pending claims, but is intended to give the artisans one practical application of the methods discussed above, in view of, for example, the exemplary fall risk state transition rules from the truth tables depicted in FIGS. 14A and 14B and in the generic sample state process illustrated on the tables depicted on FIGS. 15A and 15B and exemplary fall risk state transition rules for various patient position as depicted in FIGS. 16A, 16B, 16C, 16D and 16E. The present flowchart will be discussed at essentially a video pixel level, hence much of the process will be performed by video processor 109, in conjunction with processor 106. Careful attention should be paid to the nomenclatures listed below the flowchart in FIG. 13A.

The process begins by receiving a video frame (step 1302) and converting the pixel color information from the image to standard color component format suitable for frame processing (step 1304). Next, for each pixel in the video frame (step 1334), in a pixel by pixel mode, determining the information for the video frame that will be used for noise reduction and fall risk state processing (states 1306 through 1332). Initially, the pixel's address is identified in the frame (step 1306), along with color information (weights) for a corresponding background pixel (step 1308), which is used to determine an actual color difference ($\Delta$) for each color component (step 1310) and then the total difference ($\Delta_{RGB}$) and the absolute difference $|\Delta_{RGB}|$ of the components (step 1312). The total difference are summed ($\Sigma_p \Delta_{RGB}$) as are the absolute total differences ($|\Sigma_p \Delta_{RGB}|$) (step 1314) and then the value of the background color components are adjusted by ½ of the value of the actual differences (step 1316).

Next, the pixel is tested against a threshold pixel noise level to determine if the sum of the difference ($\Sigma_p \Delta_{RGB}$) should be retained, that is, whether $\Sigma_p \Delta_{RGB}$ exceed some preset pixel noise threshold ($\Sigma_p \Delta_{RGB} > \Sigma_{pNOISE} \Delta_{RGB}$) (step 1318), if so, $|\Sigma_p \Delta_{RGB}|$ is retained (step 1320).

In either case the sum of the differences ($\Sigma_p \Delta_{RGB}$) is compared to preset maximum pixel difference ($\Sigma_{pMAX} \Delta_{RGB}$) and minimum pixel difference ($\Sigma_{pMIN} \Delta_{RGB}$), for determining a pixel divisor (DIVISOR$_p$). If it is larger than the preset pixel maximum ($\Sigma_p \Delta_{RGB} > \Sigma_{pMAX} \Delta_{RGB}$) (step 1322), then the pixel divisor is equivalent to the pixel divisor plus a preset maximum divisor value, (DIVISOR$_p$=DIVISOR$_p$+DIVISOR$_{MAX}$), (step 1324), if it is smaller than the preset pixel minimum ($\Sigma_p \Delta_{RGB} < \Sigma_{pMIN} \Delta_{RGB}$) (step 1326), then the pixel divisor is equivalent to the pixel divisor plus a preset maximum divisor value, (DIVISOR$_p$=DIVISOR$_p$+DIVISOR$_{MIN}$), (step 1328). The divisor for the video frame is then determined as the sum of all pixel divisors (DIVISOR$_F$=DIVISOR$_F$+DIVISOR$_p$ (step 1330).

Finally, the total difference for the video frame ($\Sigma_F \Delta_{RGB}$) is determined as the sum of all the absolute total pixel differences ($|\Sigma_p \Delta_{RGB}|$), ($\Sigma_F \Delta_{RGB} = \Sigma_F \Delta_{RGB} + |\Sigma_p \Delta_{RGB}|$) (step 1332) and the process iteratively returns to step 1334 until all pixels in the current video frame have been received. At that point, the system reduces the value of the DIVISOR$_F$ (DIVISOR$_F$=(DIVISOR$_F$)/256) (step 1336) and calculates a new total difference of the pixels components in the frame ($\Sigma_F \Delta_{RGB}$) using the divisor ($\Sigma_F \Delta_{RGB} = (\Sigma_F \Delta_{RGB})/\text{DIVISOR}_F$) (step 1338) and then saves that value (step 1340).

Figure 13B:
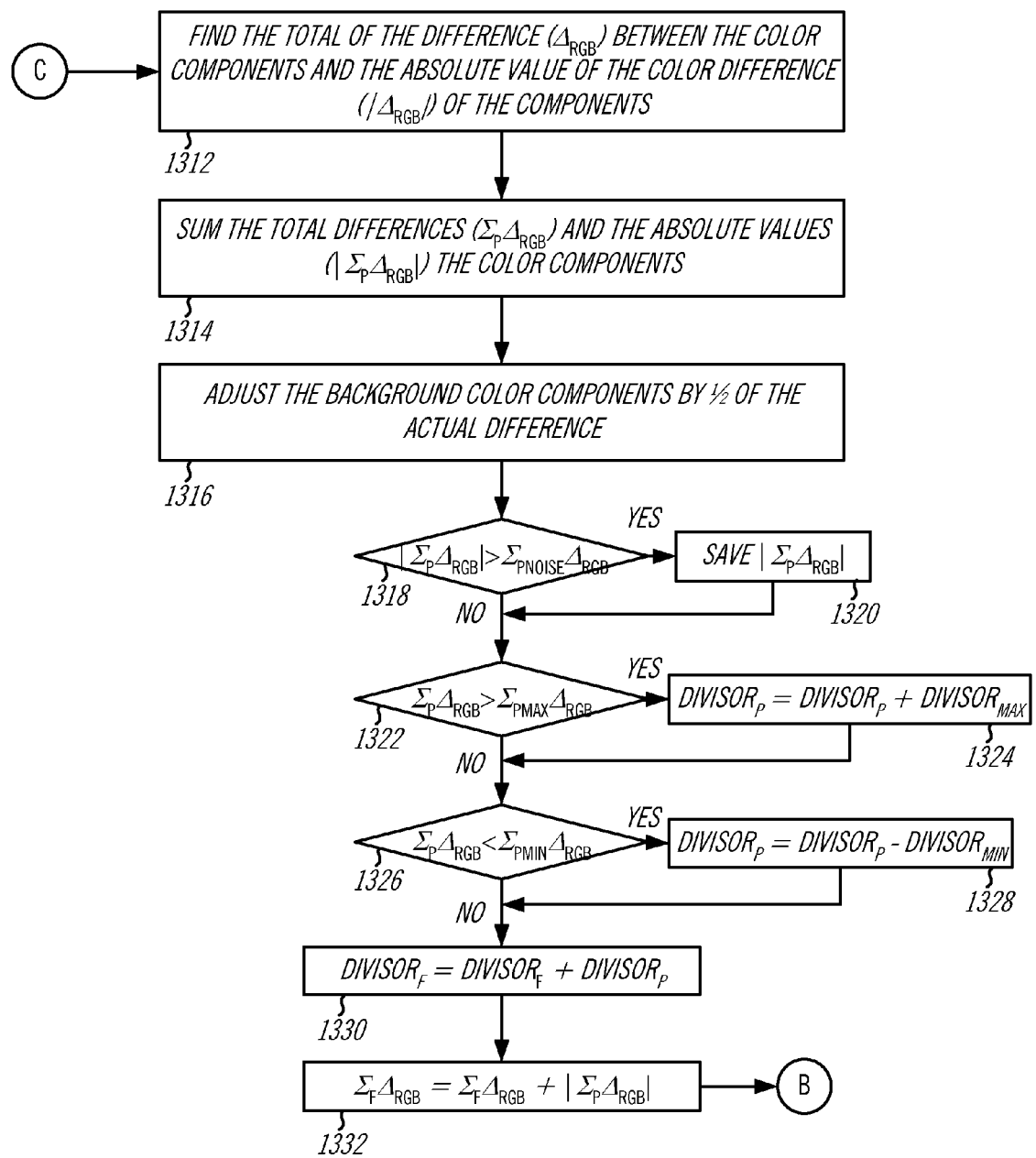
Figure 13D:
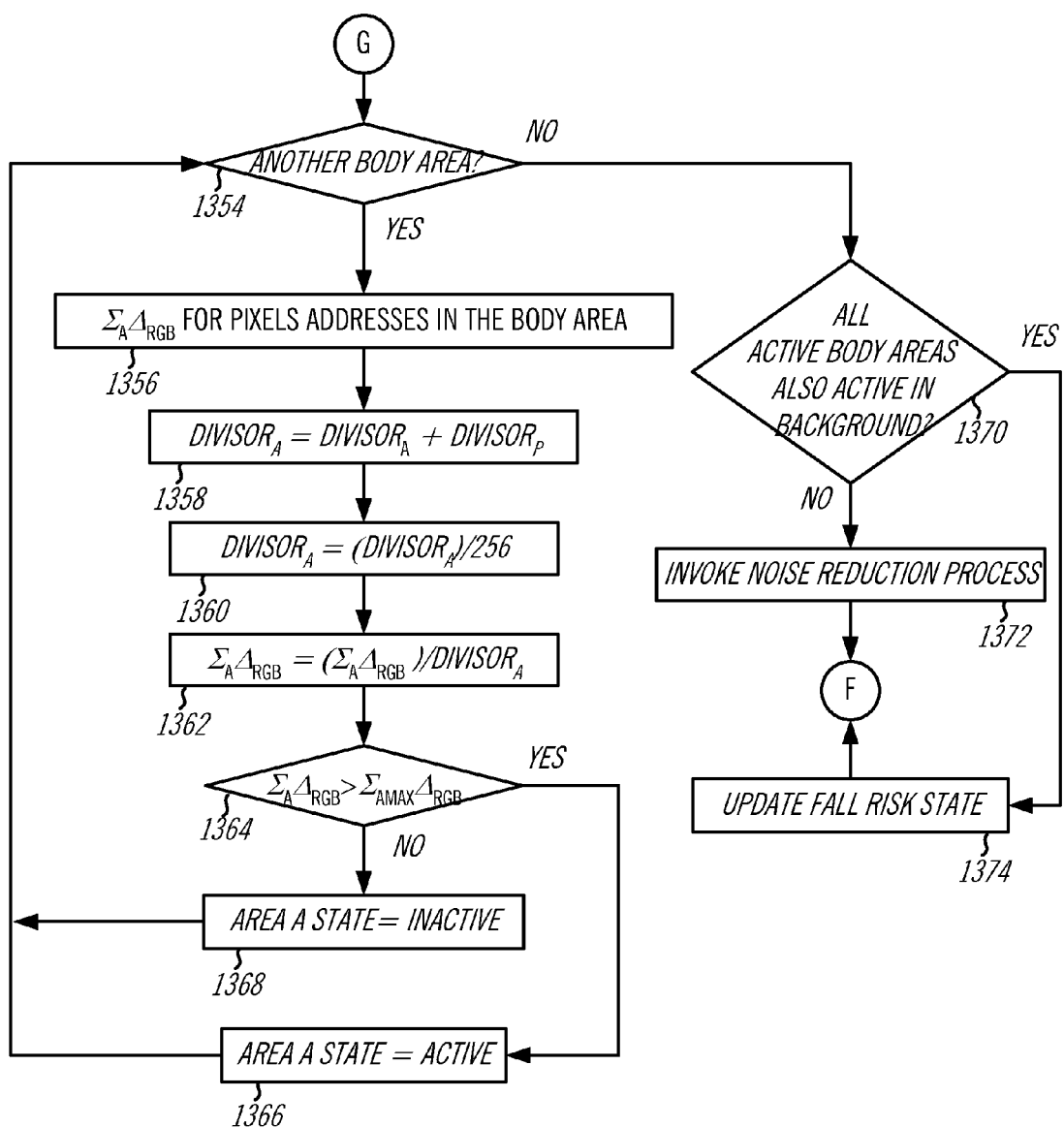

Next, the total difference of the pixels components in the frame ($\Sigma_F \Delta_{RGB}$) for the current video frame is tested for activity against a preset maximum total frame difference ($\Sigma_{FMAX} \Delta_{RGB}$), ($\Sigma_F \Delta_{RGB} > \Sigma_{FMAX} \Delta_{RGB}$) (step 1342). If $\Sigma_F \Delta_{RGB}$ exceeds $\Sigma_{FMAX} \Delta_{RGB}$, frame F is active (step 1344), meaning the present noise correcting patient fall risk state prediction system has detected motion in the patient's room, although not necessarily patient movement. In that case, the current video frame F is fall risk state processed (step 1346) (the fall risk state process is depicted in FIG. 13D). If $\Sigma_F \Delta_{RGB}$ does not exceed $\Sigma_{FMAX} \Delta_{RGB}$ (step 1342), frame F is inactive (step 1348), and optionally the process may continue by saving the frame pixel color information, DIVISOR$_p$, DIVISOR$_F$, $\Sigma_F \Delta_{RGB}$ and the state process information as background (step 1350) and returning to step 1302 for another video frame. Here it should be noted that this assumes that INACTIVE type events will not cause the present noise correcting patient fall risk state prediction system to enter a new fall risk state. In accordance with a more practical application of the present invention, whether or not the current video frame F is active, the system invokes the fall risk state process. Here, the determination of activity within the current video frame F serves only to initiate the frame archival process.

Returning to step 1346, at some point the fall risk state process is invoked and the noise correcting patient fall risk state prediction system evaluates each of the predetermined patient body areas for activity individually (step 1354). The fall risk state process begins with predetermined area A of the current video frame F and calculates total difference of pixels for area A ($\Sigma \Delta_{RGB}$) for the pixel addresses that correspond to area A (step 1356). The fall risk state process next updates the value of the DIVISOR for area A based on the DIVISOR values for the pixels in the area, pixel by pixel, (DIVISOR$_A$=DIVISOR$_A$+DIVISOR$_p$) (step 1358) and then reduces the DIVISOR$_A$ by a factor of 256 (DIVISOR$_A$=(DIVISOR$_A$)/256) (step 1360) and normalizes the total difference of pixels for area A ($\Sigma_A \Delta_{RGB}$) to the DIVISOR$_A$ ($\Sigma \Delta_{RGB} = (\Sigma_A \Delta_{RGB})/\text{DIVISOR}_A$) (step 1362) for comparison with a preset total maximum difference of pixels for area A ($\Sigma_{AMAX} \Delta_{RGB}$) (step 1364). If the total difference of pixels ($\Sigma_A \Delta_{RGB}$) exceeds the preset total maximum difference of pixels ($\Sigma_{AMAX} \Delta_{RGB}$) for area A, ($\Sigma_A \Delta_{RGB} > \Sigma_{AMAX} \Delta_{RGB}$), then AREA A is active, or more particularly, an ACTIVE event has been detected within area A (step 1366). If not, area A is inactive, or it might be said that an INACTIVE event has been detected within area A (step 1368). In either case, the system reverts to step 1354 until all patient body parts within the predetermined areas of video frame F have been evaluated. At that point, the present noise correcting patient fall risk state prediction system tests the active areas for noise, that is determines if any active areas were not active in the background frame (step 1370). If noise is detected in the areas of frame F, then the fall risk state process will not use the activity information from frame F to enter a new fall risk state but instead will retain the current fall risk state for use with the next current video frame (step 1372). If no noise is detected in the areas of frame F, then the fall risk state process will use the activity information, in concert with the fall risk state transition rules, to determine whether or not to enter a new fall risk state (step 1374). In either case, the background information is updated for frame F, e.g., the new pixel color information and $DIVISOR_P$, $DIVISOR_A$, $DIVISOR_F$, $\Sigma_A \Delta_{RGB}$ (for each of the predetermined areas in frame F), $\Sigma_F \Delta_{RGB}$, and the fall risk state information (step 1350) and a new current video frame F received (step 1302). The process continues, iteratively, with each new video frame.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for predicting a risk of a patient fall based on a plurality of fall risk states, the plurality of fall risk states defining a hierarchy of discrete fall risk states, at least one of the fall risk states being associated with an action, the method comprising:

receiving a plurality of video frames from a surveillance video camera, said surveillance video camera captures a sequence of video frames of a surveillance area, wherein a patient is present in the surveillance area, each of the plurality of video frames comprising a plurality of predetermined areas;

detecting a change in at least one of the plurality of predetermined areas of the current video frame of the plurality of video frames;

evaluating the change detected in the at least one of the plurality of predetermined areas of the current video frame for noise; and identifying a fall risk transition to a fall risk state selected from the hierarchy of discrete fall risk states, the hierarchy of discrete fall risk states including a wait state, a no-wait state, and at least one other state, and wherein each fall risk state includes event and timing information, wherein the identification of a fall risk transition is based upon the change detected in the at least one of the plurality of predetermined areas of the current video frame.

2. The method recited in claim 1 above, wherein the plurality of fall risk states comprise a first fall risk state, and intermediate fall risk state wherein the patient is at a higher risk of a fall than the first fall risk state and a critical fall risk state, wherein the patient is at a higher risk of a fall than the first or intermediate fall risk states, wherein identifying a fall risk state from the hierarchy of discrete fall risk states from the change detected in the at least one of the plurality of predetermined areas of the current video frame further comprises:

entering the critical fall risk state from the intermediate fall risk state; and issuing a fall alert based on entry into the critical fall risk state.

3. The method recited in claim 2 above, wherein identifying a fall risk state from the hierarchy of discrete fall risk states from the change detected in the at least one of the plurality of predetermined areas of the current video frame further comprises:

determining a current fall risk state of the hierarchy of discrete fall risk states, said current fall risk state being identified based on detecting a change in at least one of the plurality of predetermined areas of a background video frame of the plurality of video frames;

identifying a changed predetermined area of the plurality of predetermined areas; accessing a set of fall risk state transition rules, said fall risk state transition rules define entry into a new fall risk state from a previous fall risk state based on an identity of a changed area;

identifying a fall state transition rule from the set of fall risk state transition rules for the current fall risk state and the identified changed predetermined area; and entering a second fall risk state based on the identified fall state transition rule.

4. The method recited in claim 3 above, wherein detecting a change in at least one of the plurality of predetermined areas of the current video frame of the plurality of video frames, further comprises:

identifying a first plurality of pixels comprising a first predetermined area, a second plurality of pixels comprising a second predetermined area and a third plurality of pixels comprising a third predetermined area;

converting color information to a color value for each pixel of the first, second and third plurality of pixels of the first, second and third predetermined areas;

find a first current total area pixel weight of a color value all pixels for the first plurality of pixels, a second current total area pixel weight of a color value all pixels for the second plurality of pixels and a third current total area pixel weight of a color value all pixels for the third plurality in the respective first, second and third predetermined areas of the current video frame;

receiving a first background total area pixel weight of a color value all pixels in the first plurality of pixels, a second background total area pixel weight of a color value all pixels in the second plurality of pixels and a third background total area pixel weight of a color value all pixels in the third plurality of pixels of a corresponding one of the first, second and third predetermined areas of a background video frame; and finding a first area difference total between the first current total area pixel weight and the first background total area pixel weight, a second area difference total between the second current total area pixel weight and the second background total area pixel weight and a third area difference total between the third current total area pixel weight and the third background total area pixel weight; and comparing the first area difference total to a first threshold motion amount for the first predetermined area, second area difference total to a second threshold motion amount for the second predetermined area and third threshold motion amount for the third predetermined area of the current video frame.

5. The method recited in claim 1, wherein issuing a fall alert further comprises:
   transmitting a remote location from the surveillance video camera; and
   generating one of an audible alarm, a visual alarm, an audible message and a visual message at the remote location from the surveillance video camera.

6. The method recited in claim 1, wherein issuing a fall alert further comprises:
   generating one of an audible alarm, a visual alarm, an audible message and a visual message locally to the surveillance video camera.

7. The method recited in claim 4, wherein the color information is one of chrominance and luminance.

8. The method recited in claim 4, wherein the color information is luminance.

9. The method recited in claim 4, wherein any predetermined area that exceeds the threshold motion amount is flagged as ACTIVE for the current video frame, the method further comprises:
   storing an ACTIVE flag with any predetermined area that exceeds the threshold motion amount each.

10. The method recited in claim 9, wherein evaluating the change detected in the at least one of the plurality of predetermined areas of the current video frame for noise, further comprises:
   receiving ACTIVE flags associated with predetermined areas of a background video frame;
   identifying ACTIVE predetermined areas for the current video frame;
   identifying an ACTIVE predetermined area for the current video frame without an ACTIVE flag for a corresponding predetermined area the background video frame; and
   setting a fall risk state for the current video frame to the as the current fall risk state from the background video frame.

11. A system for predicting a risk of a patient fall based on a plurality of fall risk states, the plurality of fall risk states defining a hierarchy of discrete fall risk states, at least one of the fall risk states being associated with an action, the system comprising:
   a surveillance video camera operative to capture a plurality of video frames of a surveillance area, wherein a patient is present in the surveillance area and each of the plurality of video frames comprises a plurality of predetermined areas; and a video processor operative to detect a change in at least one of the plurality of predetermined areas of the current video frame of the plurality of video frames, evaluate the change detected in the at least one of the plurality of predetermined areas of the current video frame for noise, and identify a fall risk transition to a fall risk state selected from the hierarchy of discrete fall risk states, the hierarchy of discrete fall risk states including a wait state, a no-wait state, and at least one other state, and wherein each fall risk state includes event and timing information, wherein the identification of a fall risk transition is based upon the change detected in the at least one of the plurality of predetermined areas of the current video frame.

12. The system recited in claim 11 above, wherein the plurality of fall risk states comprise a first fall risk state, and intermediate fall risk state wherein the patient is at a higher risk of a fall than the first fall risk state and a critical fall risk state, wherein the patient is at a higher risk of a fall than the first or intermediate fall risk states, wherein identifying a fall risk state from the hierarchy of discrete fall risk states from the change detected in the at least one of the plurality of predetermined areas of the current video frame further comprises entering the critical fall risk state from the intermediate fall risk state and issuing a fall alert based on entry into the critical fall risk state.

13. The system recited in claim 12 above, wherein identifying a fall risk state from the hierarchy of discrete fall risk states from the change detected in the at least one of the plurality of predetermined areas of the current video frame further comprises:
   determining a current fall risk state of the hierarchy of discrete fall risk states, said current fall risk state being identified based on detecting a change in at least one of the plurality of predetermined areas of a background video frame of the plurality of video frames;
   identifying a changed predetermined area of the plurality of predetermined areas; accessing a set of fall risk state transition rules, said fall risk state transition rules define entry into a new fall risk state from a previous fall risk state based on an identity of a changed area;
   identifying a fall state transition rule from the set of fall risk state transition rules for the current fall risk state and the identified changed predetermined area; and
   entering a second fall risk state based on the identified fall state transition rule.

14. The system recited in claim 13 above, wherein detecting a change in at least one of the plurality of predetermined areas of the current video frame of the plurality of video frames, further comprises:
   identifying a first plurality of pixels comprising a first predetermined area, a second plurality of pixels comprising a second predetermined area and a third plurality of pixels comprising a third predetermined area;
   converting color information to a color value for each pixel of the first, second and third plurality of pixels of the first, second and third predetermined areas;
   find a first current total area pixel weight of a color value all pixels for the first plurality of pixels, a second current total area pixel weight of a color value all pixels for the second plurality of pixels and a third current total area pixel weight of a color value all pixels for the third plurality in the respective first, second and third predetermined areas of the current video frame;
   receiving a first background total area pixel weight of a color value all pixels in the first plurality of pixels, a second background total area pixel weight of a color value all pixels in the second plurality of pixels and a third background total area pixel weight of a color value all pixels in the third plurality of pixels of a corresponding one of the first, second and third predetermined areas of a background video frame; and finding a first area difference total between the first current total area pixel weight and the first background total area pixel weight, a second area difference total between the second current total area pixel weight and the second background total area pixel weight and a third area difference total between the third current total area pixel weight and the third background total area pixel weight; and comparing the first area difference total to a first threshold motion amount for the first predetermined area, second area difference total to a second threshold motion amount for the second predetermined area and third threshold motion amount for the third predetermined area of the current video frame.

15. The system recited in claim 11, wherein issuing a fall alert further comprises:

transmitting a remote location from the surveillance video camera; and generating one of an audible alarm, a visual alarm, an audible message and a visual message at the remote location from the surveillance video camera.

16. The system recited in claim 11, wherein issuing a fall alert further comprises generating one of an audible alarm, a visual alarm, an audible message and a visual message locally to the surveillance video camera.

17. The system recited in claim 14, wherein the color information is one of chrominance and luminance.

18. The system recited in claim 14, wherein the color information is luminance.

19. The system recited in claim 14, wherein any predetermined area that exceeds the threshold motion amount is flagged as ACTIVE for the current video frame, the method further comprises:

storing an ACTIVE flag with any predetermined area that exceeds the threshold motion amount each.

20. The system recited in claim 19, wherein evaluating the change detected in the at least one of the plurality of predetermined areas of the current video frame for noise, further comprises:

receiving ACTIVE flags associated with predetermined areas of a background video frame;

identifying ACTIVE predetermined areas for the current video frame;

identifying an ACTIVE predetermined area for the current video frame without an ACTIVE flag for a corresponding predetermined area the background video frame; and setting a fall risk state for the current video frame to the as the current fall risk state from the background video frame.

* * * * *